(12) United States Patent
Tateishi et al.

(10) Patent No.: US 10,169,102 B2
(45) Date of Patent: Jan. 1, 2019

(54) LOAD CALCULATION METHOD, LOAD CALCULATION PROGRAM, AND LOAD CALCULATION APPARATUS

(71) Applicant: FUJITSU LIMITED, Kawasaki-shi, Kanagawa (JP)

(72) Inventors: Naoki Tateishi, Nagoya (JP); Kiyoshi Kouge, Kuwana (JP); Kensuke Tokoda, Nagoya (JP); Ichiro Kotani, Nagoya (JP); Satoshi Ohta, Kitanagoya (JP); Takaaki Nakazawa, Nagoya (JP); Satoshi Matsuda, Nagoya (JP); Hui Li, Obu (JP); Kazunori Kandani, Nagoya (JP); Saeko Nakamura, Ichinomiya (JP); Yukihisa Miyagawa, Tsushima (JP); Yuki Torii, Anjo (JP); Yoko Yonemoto, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 14/987,804

(22) Filed: Jan. 5, 2016

(65) Prior Publication Data

US 2016/0203030 A1 Jul. 14, 2016

(30) Foreign Application Priority Data

Jan. 8, 2015 (JP) .................................. 2015-001955

(51) Int. Cl.
*G06F 9/455* (2018.01)
*G06F 9/46* (2006.01)
*G06F 9/50* (2006.01)

(52) U.S. Cl.
CPC ........ *G06F 9/5083* (2013.01); *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

2009/0122702 A1\* 5/2009 Chew ...................... H04L 47/30
370/235
2009/0133018 A1 5/2009 Kaneki
(Continued)

FOREIGN PATENT DOCUMENTS

| JP | 2009-123174 | 6/2009 |
| JP | 2009-239374 | 10/2009 |
| JP | 2011-258098 | 12/2011 |

*Primary Examiner* — Lewis A Bullock, Jr.
*Assistant Examiner* — Melissa A Alfred
(74) *Attorney, Agent, or Firm* — Fujitsu Patent Center

(57) ABSTRACT

A load calculation program that causes a computer a process includes acquiring processor usage information including usage of a processor of an managed computer, which is a management object, and usage of the processor for each of a plurality of virtual machines generated by a hypervisor executed on the managed computer; acquiring data transmission information including a data transmission amount for each virtual network interface used by the plurality of virtual machines; detecting a first virtual network interface that performs data transmission without routing through the hypervisor among the plurality of virtual network interfaces, based on the processor usage information and the data transmission information; and calculating load information including processor usage for data transmission of each of the plurality of virtual machines, based on whether or not each of the virtual machines uses the first virtual network interface.

8 Claims, 29 Drawing Sheets

(56) References Cited

U.S. PATENT DOCUMENTS

| | | | |
|---|---|---|---|
| 2011/0307889 A1 | 12/2011 | Moriki et al. | |
| 2013/0151685 A1* | 6/2013 | Bursell | H04L 45/66 709/223 |
| 2014/0258446 A1* | 9/2014 | Bursell | G06F 15/177 709/217 |
| 2015/0339145 A1* | 11/2015 | Kim | G06F 9/45558 718/1 |

* cited by examiner

FIG. 5
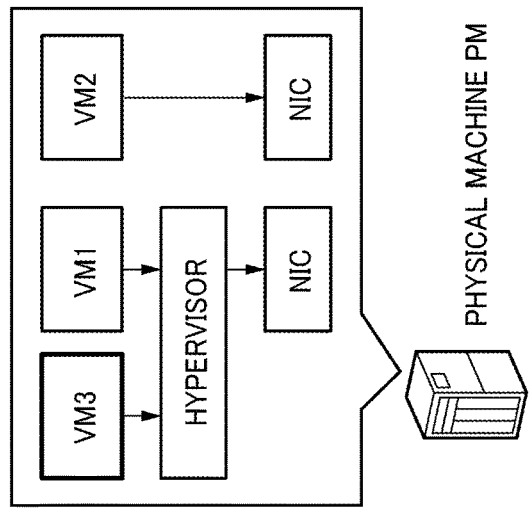
ADDITION OF VM3
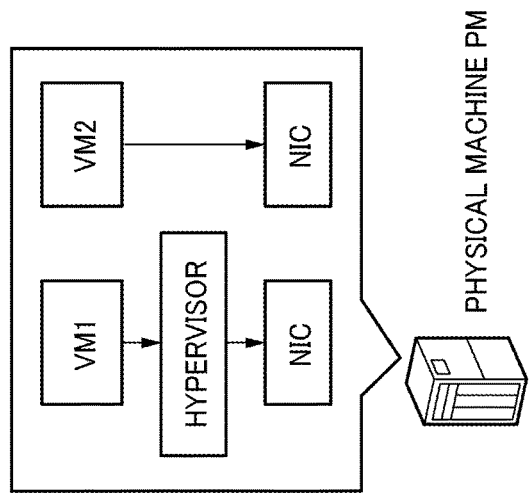

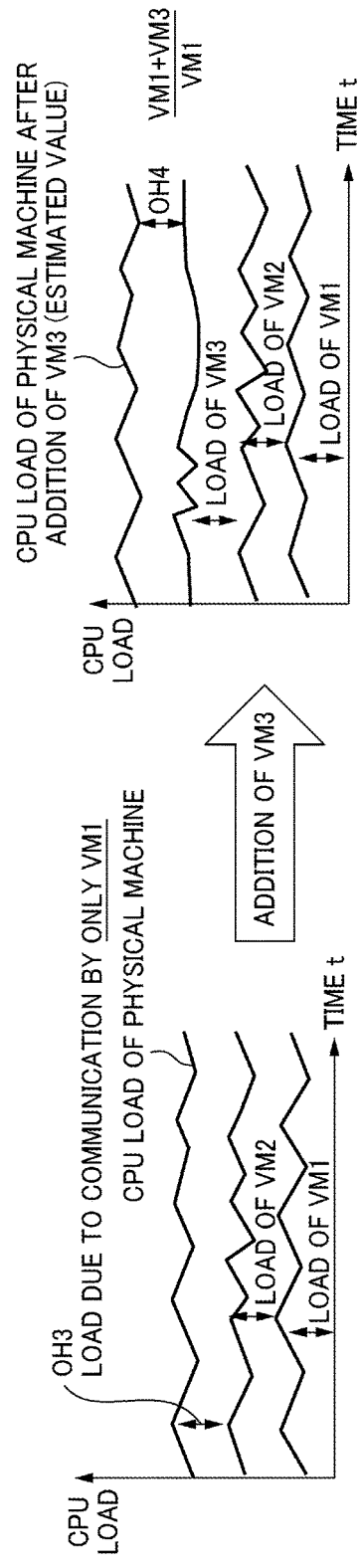

FIG. 7
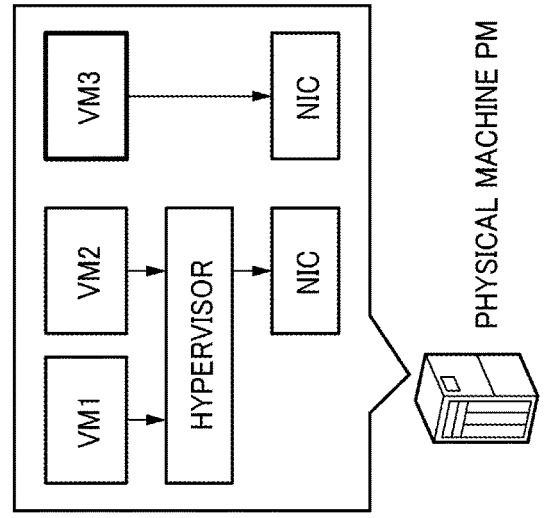
ADDITION OF VM3
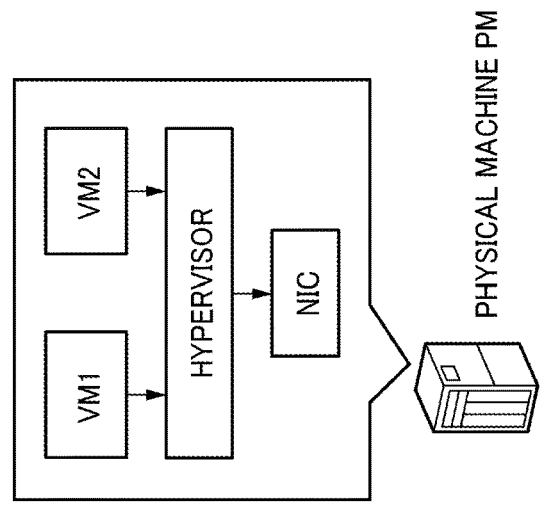

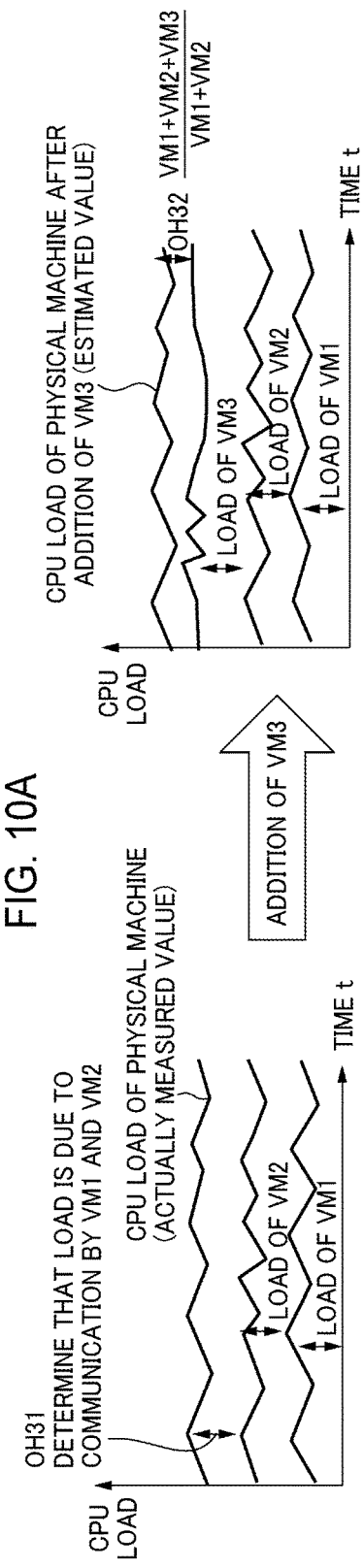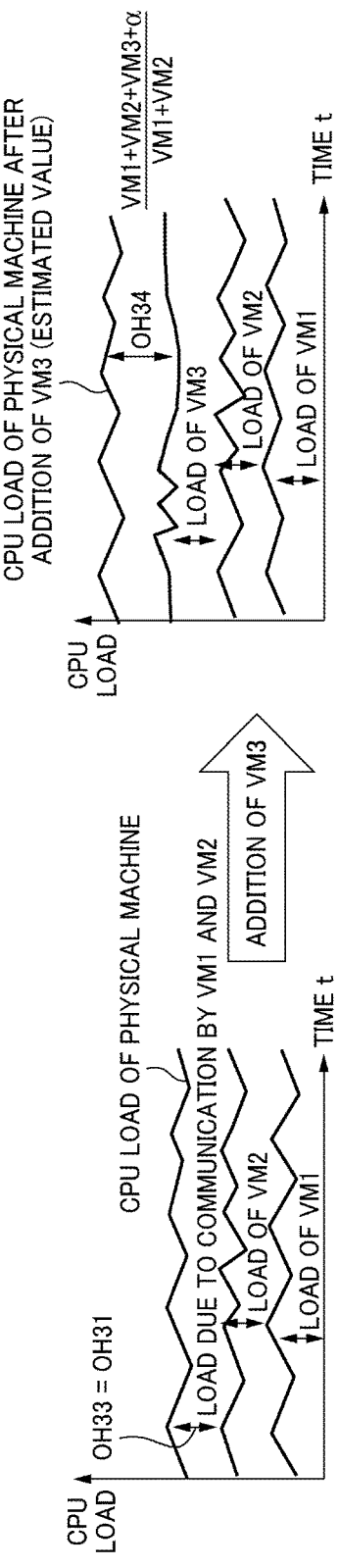

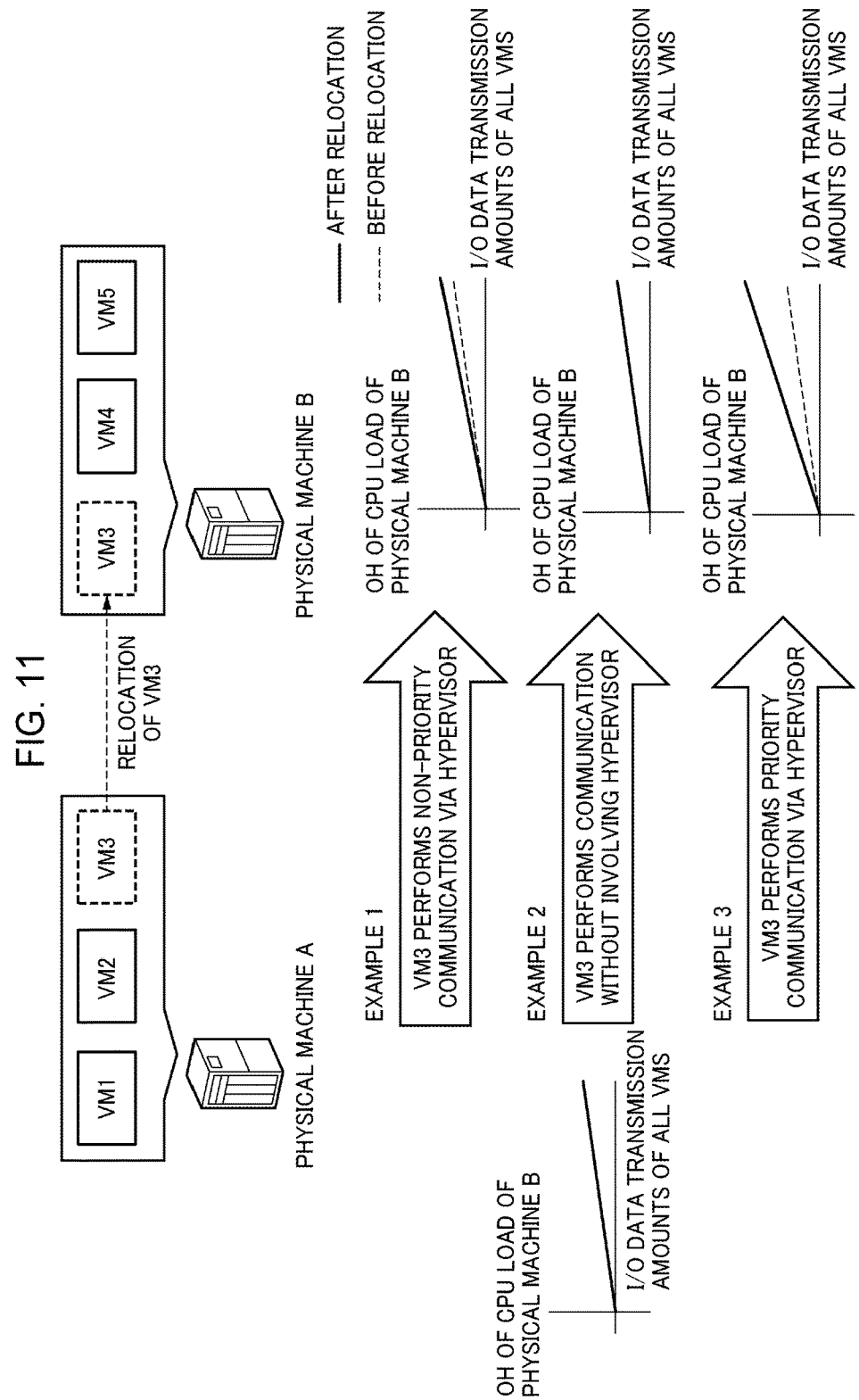

FIG. 23

| MANAGEMENT ID | PHYSICAL MACHINE NAME |
|---|---|
| 1 | HostA |
| 2 | HostB |
| 3 | HostC |

FIG. 24

| MANAGEMENT ID | VIRTUAL MACHINE NAME | PHYSICAL MACHINE NAME |
|---|---|---|
| 1 | VM1 | HostA |
| 2 | VM2 | HostA |
| 3 | VM3 | HostA |
| 4 | VM4 | HostB |
| 5 | VM5 | HostB |
| 6 | VM6 | HostB |
| 7 | VM7 | HostB |
| 8 | VM8 | HostB |
| 9 | VM9 | HostC |
| 10 | VM10 | HostC |
| 11 | VM11 | HostC |
| 12 | VM12 | HostC |

FIG. 25

| MANAGEMENT ID | VIRTUAL MACHINE NAME | V_NIC NAME | NETWORK CONFIGURATION | NETWORK CONFIGURATION DETERMINATION DATES AND TIMES |
|---|---|---|---|---|
| 1 | VM1 | eth0 | NOT DETERMINED | NOT DETERMINED |
| 2 | VM1 | eth1 | NOT DETERMINED | NOT DETERMINED |
| 3 | VM2 | eth0 | WITHOUT INVOLVING HYPERVISOR | 2014/8/30 14:25 |
| 4 | VM2 | eth1 | WITHOUT INVOLVING HYPERVISOR | 2014/8/30 14:25 |
| 5 | VM2 | eth2 | WITHOUT INVOLVING HYPERVISOR | 2014/8/30 14:25 |

FIG. 26

| MANAGEMENT ID | MACHINE NAME | THRESHOLD MONITORING SETTING DATES AND TIMES |
|---|---|---|
| 1 | HostA | 2014/8/23 15:25 |
| 2 | HostB | 2014/8/23 15:25 |
| 3 | HostC | 2014/8/23 15:25 |
| 4 | VM1 | 2014/8/24 8:25 |
| 5 | VM2 | 2014/8/25 9:13 |
| 6 | VM3 | 2014/9/3 13:42 |

FIG. 27

| MANAGEMENT ID | MACHINE NAME | NIC NAME | IP ADDRESS |
|---|---|---|---|
| 1 | HostA | eth0 | 192.168.0.1 |
| 2 | HostA | eth1 | 192.168.0.2 |
| 3 | HostA | eth2 | 192.168.0.3 |
| 4 | HostA | eth3 | 192.168.0.4 |
| 5 | HostB | hme0 | 192.168.1.1 |
| 6 | HostB | hme1 | 192.168.1.2 |
| 7 | HostB | hme2 | 192.168.1.3 |
| 8 | HostB | hme3 | 192.168.1.4 |
| 9 | HostB | hme4 | 192.168.1.5 |
| 10 | HostB | hme5 | 192.168.1.6 |
| 11 | HostC | eth0 | 192.168.2.1 |
| 12 | HostC | eth1 | 192.168.2.2 |
| 13 | HostC | eth2 | 192.168.2.3 |
| 14 | HostC | eth3 | 192.168.2.4 |
| 15 | HostC | eth4 | 192.168.2.5 |
| 16 | HostC | eth5 | 192.168.2.6 |
| 17 | HostC | eth6 | 192.168.2.7 |
| 18 | HostC | eth7 | 192.168.2.8 |
| 19 | VM1 | eth0 | 192.168.0.5 |
| 20 | VM1 | eth1 | 192.168.0.6 |
| 21 | VM2 | eth0 | 192.168.0.7 |
| 22 | VM2 | eth1 | 192.168.0.8 |
| 23 | VM2 | eth2 | 192.168.0.9 |
| 24 | VM3 | eth0 | 192.168.0.10 |

FIG. 28

| MANAGEMENT ID | MACHINE NAME | NIC NAME | TIME | TRANSMISSION VOLUME/sec [byte] |
|---|---|---|---|---|
| 1 | VM1 | eth0 | 2014 8/25 13:00 | 5872025 |
| 2 | VM1 | eth1 | 2014 8/25 13:00 | 4928307 |
| 3 | VM2 | eth0 | 2014 8/25 13:00 | 262144 |
| 4 | VM1 | eth0 | 2014 8/25 13:10 | 6372535 |
| 5 | VM1 | eth1 | 2014 8/25 13:10 | 2359296 |
| 6 | VM2 | eth0 | 2014 8/25 13:10 | 3866574 |

| MANAGEMENT ID | MACHINE NAME | TIME | CPU USAGE [MHz] |
|---|---|---|---|
| 1 | HostA | 2014 8/25 13:00 | 1536 |
| 2 | HostB | 2014 8/25 13:00 | 1211 |
| 3 | HostC | 2014 8/25 13:00 | 2388 |
| 4 | VM1 | 2014 8/25 13:00 | 534 |
| 5 | VM2 | 2014 8/25 13:00 | 633 |
| 6 | VM3 | 2014 8/25 13:00 | 856 |

FIG. 29

| MANAGEMENT ID | MACHINE NAME | TIME | CPU INTERRUPT/sec |
|---|---|---|---|
| 1 | HostA | 2014 8/25 13:00 | 34 |
| 2 | HostB | 2014 8/25 13:00 | 13 |
| 3 | HostC | 2014 8/25 13:00 | 5 |

| MANAGEMENT ID | PHYSICAL MACHINE NAME | CPU LOAD IN CASE OF PRIORITY CONTROL BY HYPERVISOR [RATIO TO CPU LOAD WHEN ONLY COMMUNICATING VIA HYPERVISOR] |
|---|---|---|
| 1 | HostA | 1.08 |
| 2 | HostB | 1.05 |
| 3 | HostC | 1.07 |

LOAD CALCULATION METHOD, LOAD CALCULATION PROGRAM, AND LOAD CALCULATION APPARATUS

CROSS-REFERENCE TO RELATED APPLICATION

This application is based upon and claims the benefit of priority of the prior Japanese Patent Application No. 2015-001955, filed on Jan. 8, 2015, the entire contents of which are incorporated herein by reference.

FIELD

The present invention relates to a load calculation method, a load calculation program, and a load calculation apparatus.

BACKGROUND

A hypervisor that is a virtualization program generates a plurality of virtual machines on a physical machine. By having a plurality of users use the plurality of virtual machines generated on the physical machine, the physical machine is efficiently utilized. The physical machine is a computer or an information processing device.

In an information processing system that generates a plurality of virtual machines on a physical machine, a virtual machine may be added to a physical machine or a virtual machine generated on a physical machine may be relocated to another physical machine. In such cases, it is needed to estimate a load on a physical machine due to an operation of a virtual machine such as a CPU load (or CPU usage, a processor load, or processor usage).

A CPU load of a virtual machine includes a load for processing by the virtual machine and a load for I/O data transmission. The CPU load for I/O data transmission is a load based on processing of a virtual switch by a hypervisor between a virtual network interface (hereinafter, referred to as a virtual NIC (Network Interface Card)) of a virtual machine and a physical network interface (hereinafter, referred to as a physical NIC). The CPU load for I/O data transmission is normally estimated based on an I/O data transmission amount of a virtual NIC of a virtual machine.

Estimation of a load of a virtual machine is described in Japanese Patent Application Laid-open No. 2009-123174, Japanese Patent Application Laid-open No. 2011-258098, and Japanese Patent Application Laid-open No. 2009-239374.

SUMMARY

In recent years, due to dramatic improvements in the processing capability of virtual switches of hypervisors, an I/O data transmission amount of a virtual machine has increased and, accordingly, CPU load has increased. Therefore, it is needed to estimate a CPU load of a virtual machine in consideration of a CPU load for I/O data transmission of the virtual machine.

However, virtual machines are now capable of performing data transmission directly via a physical NIC without involving a hypervisor. In other words, by using a physical NIC capable of SR-IOV (Single Root IO Virtualization) which is a physical NIC having functions of a virtual switch originally executed by a hypervisor, a virtual NIC of a virtual machine can perform I/O data transmission directly with an SR-IOV-capable physical NIC without involving a virtual switch of a hypervisor. A CPU load of a virtual NIC that does not involve a hypervisor as described above is better to be estimated separately from a CPU load of a virtual NIC that uses a virtual switch of the hypervisor.

In addition, when different hypervisors are respectively mounted to a plurality of physical machines, manually managing network configurations of virtual NICs of virtual machines needs a large number of processes.

Therefore, it is needed to acquire a network configuration of a virtual NIC of virtual machine at low cost, calculate a CPU load corresponding to the network configuration, and estimate a CPU load of the virtual machine with high accuracy.

According to one aspect of the disclosure is a non-transitory computer-readable storage medium storing therein a load calculation program that causes a computer to execute a process that includes: acquiring processor usage information including usage of a processor of a managed computer, and usage of the processor for each of a plurality of virtual machines generated by a hypervisor executed on the managed computer; acquiring data transmission information including a data transmission amount for each virtual network interface used by the plurality of virtual machines; detecting a first virtual network interface that performs data transmission without routing through the hypervisor among the plurality of virtual network interfaces, based on the processor usage information and the data transmission information; and calculating load information including processor usage for data transmission of each of the plurality of virtual machines, based on whether or not each of the plurality of virtual machines uses the first virtual network interface.

According to the aspect, a CPU load of a virtual machine can be estimated with high accuracy.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example (Example 1) where a virtual machine set to the second network configuration is added to a physical machine PM in which virtual machines set to the first network configuration have been generated;

FIGS. 6A and 6B are diagrams explaining estimation of a CPU load of a physical machine in the example illustrated in FIG. 5;

FIG. 7 is a diagram illustrating an example (Example 2) where a virtual machine set to the first network configuration is added to a physical machine PM in which virtual machines set to the second network configuration have been generated;

FIGS. 10A and 10B are diagrams explaining estimation of a CPU load of a physical machine in the example illustrated in FIG. 9;

FIG. 11 is a diagram illustrating fluctuations in an overhead of a CPU load of a physical machine in Examples 1, 2, and 3;

FIG. 23 is an example of a physical machine list table included in a configuration information database (DB);

FIG. 24 is an example of a virtual machine VM list table included in the configuration information database (DB);

FIG. 25 is a diagram illustrating an example of a network configuration table included in a network configuration information database (DB);

FIG. 26 is a diagram illustrating an example of a threshold monitoring setting table included in a monitoring setting database (DB);

FIG. 27 is an example of a network interface (physical NIC and virtual NIC (V_NIC)) list table included in the configuration information database (DB);

FIG. 28 is a diagram illustrating an example of a transmission volume (I/O data transmission amount) table of virtual NICs of virtual machines and an example of a CPU load (CPU usage) table of physical machines and virtual machines which are included in a performance information database (DB); and FIG. 29 is a diagram illustrating an example of a CPU interrupt table of physical machines included in the performance information database (DB) and an example of the network configuration information database (DB).

DESCRIPTION OF EMBODIMENTS

Figure 1:
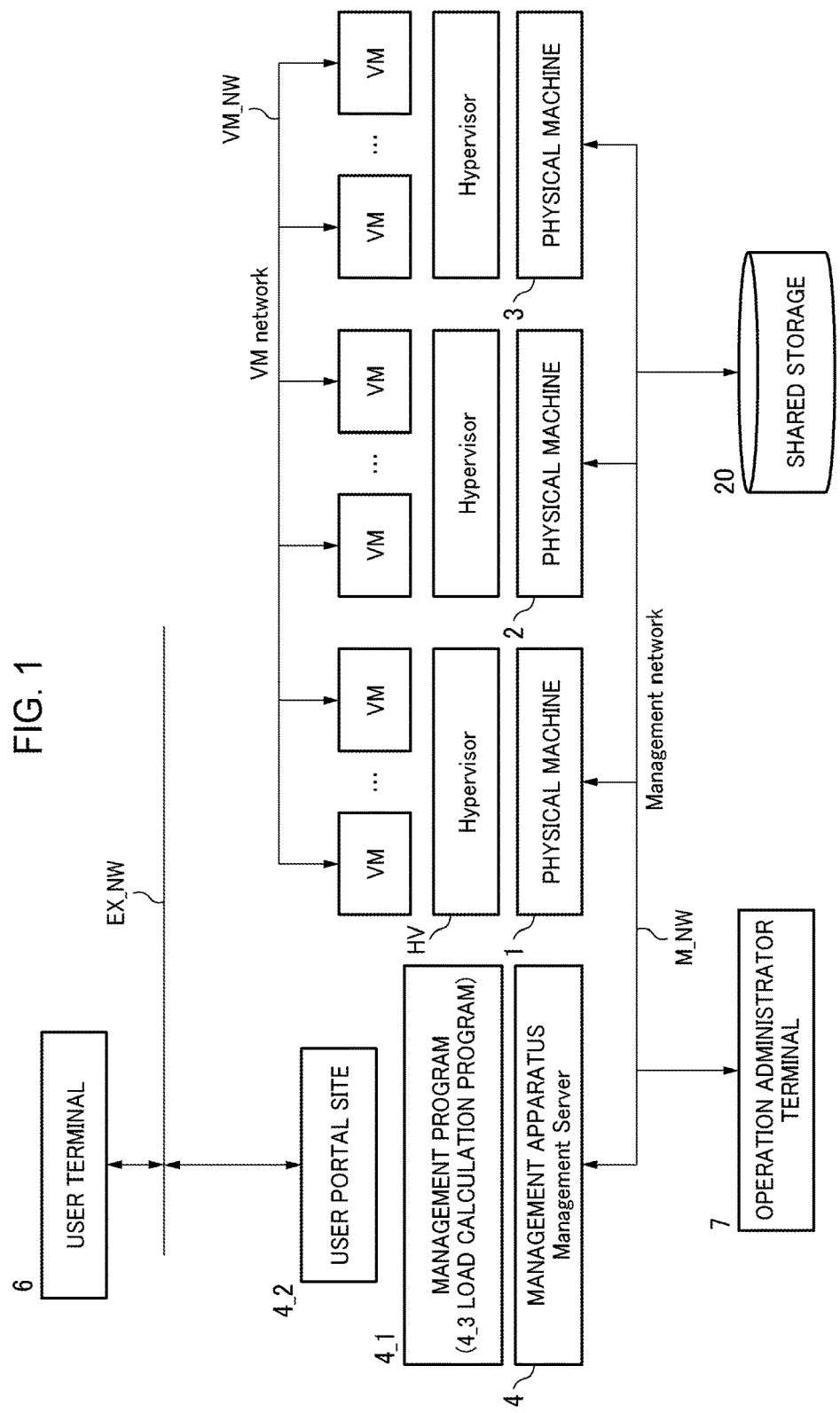
FIG. 1 is a diagram illustrating a configuration of an information processing system according to the present embodiment.

FIG. 1 is a diagram illustrating a configuration of an information processing system according to the present embodiment. An information system includes a plurality of physical machines (or VM hosts) 1, 2, and 3 which execute a plurality of virtual machines VM on a hypervisor HV, a management apparatus (or server) 4 which manages the physical machines and the virtual machines, and a shared storage 20. The information system is constructed in a data center (or a server facility) where a large number of physical machines are deployed. The data center provides a private cloud service or a public cloud service by providing hardware resources such as a physical machine to users.

Each physical machine (or host machine) 1, 2, or 3 executes the hypervisor HV to start up (or boot) and execute the plurality of virtual machines VM. In other words, the hypervisor HV starts up (or boot) and executes the virtual machines VM. The shared storage 20 stores an image file including a guest OS (Operating System) and an application program of the virtual machine VM. The virtual machines VM expand the guest OS and the application program in the image file stored in the shared storage 20 in memories of the physical machines 1, 2, and 3 and execute the guest OS and the application program expanded in the memories to construct a desired service system.

A management program 4_1 of the management apparatus 4 starts up a virtual machine based on configuration information in the hypervisor HV and, when needed, pauses or resumes the virtual machine, and shut down the virtual machine. The configuration information includes information such as the number of CPU cores and memory capacity to be assigned to a virtual machine VM.

In addition, the management program 4_1 of the management apparatus 4 collects configuration information and operation information of physical machines and virtual machines and, when needed, migrates a virtual machine running on a physical machine to another physical machine. Furthermore, the management program 4_1 adds a new virtual machine to a physical machine and deletes a virtual machine from a physical machine. In other words, the management program 4_1 includes a performance information collecting unit which collects operating states of physical machines and virtual machines and the like, and a virtual machine arranging (or deploying) unit which migrates a virtual machine to arrange (or deploy) the virtual machine in a different physical machine, which adds a new virtual machine to a physical machine, and which deletes a virtual machine.

Furthermore, in the present embodiment, the management program 4_1 includes a load calculation program 4_3 for estimating a CPU load of a virtual machine VM. The load calculation program 4_3 determines a network configuration of a virtual NIC of a virtual machine based on operation information collected by the performance information collecting unit and calculates a CPU load of the virtual machine based on the determined network configuration. The management program 4_1 determines an arrangement (or deployment) destination of a virtual machine based on the calculated CPU load of the virtual machine.

In this case, a CPU load refers to, for example, usage of the CPU. The usage of a CPU is expressed by the number of clocks per unit time of CPU use. Moreover, a CPU utilization rate represents a proportion of the number of clocks of CPU use per unit time to the number of clocks of the CPU per unit time. By calculating a load of a CPU in terms of usage, a CPU load of a virtual machine VM can be estimated with respect to a physical machine mounted with a CPU accommodating various numbers of clocks.

In addition, the VM management program 4_1 of the management apparatus 4 provides a user terminal 6 that operates the service system constructed by virtual machines with a portal site 4_2. The user terminal 6 accesses the portal site 4_2 via an external network EX_NW and performs maintenance and management of the service system.

The respective physical machines 1, 2, and 3, the management apparatus 4, and the shared storage 20 are capable of communicating with each other via a management network M_NW. An operation administrator terminal 7 of the information processing system is, for example, capable of accessing the management apparatus 4 via the management network M_NW. In addition, the user terminal 6 accesses the management apparatus 4 via the portal site 4_2 and requests a virtual machine to be newly started up, shut down, or the like. Furthermore, the respective virtual machines VM are capable of communicating with each other via a VM network VM_NW. In addition, the virtual machines VM are accessed by a service system user (not illustrated) who accesses the service system constructed by virtual machines via the external network EX_NW (for example, the Internet or an intranet).

While the VM network VM_NW is illustrated directly connected to each virtual machine VM in FIG. 1, in reality, the virtual machines VM are connected to the VM network VM_NW via network interfaces of the physical machines 1, 2, and 3. The management network M_NW is also connected to the network interfaces of the physical machines 1, 2, and 3.

Figure 2:
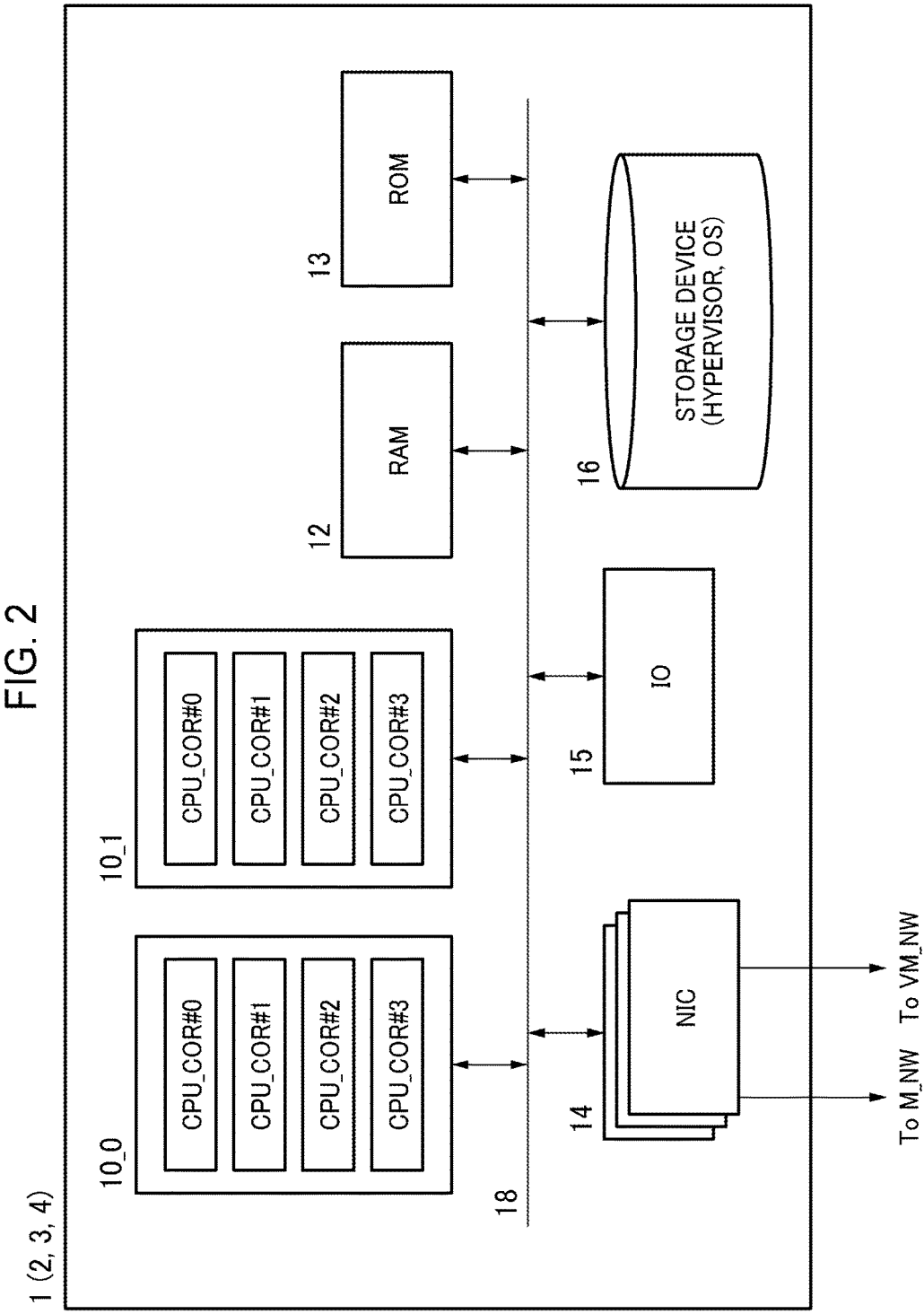
FIG. 2 is a diagram illustrating a schematic configuration of the respective physical machines 1, 2, and 3 illustrated in FIG. 1.

FIG. 2 is a diagram illustrating a schematic configuration of the respective physical machines 1, 2, and 3 illustrated in FIG. 1. For example, the physical machines or computers 1, 2, and 3 include CPUs 10_0 and 10_1 which are operation processor devices, a RAM 12 and a ROM 13 which are memories, a physical network interface (physical NIC) 14, an input/output unit 15, and a large-capacity storage device 16 such as a hard disk. These components are connected via a bus 18. The two CPUs 10_0 and 10_1 which are operation processor devices respectively include, for example, four CPU cores CPU_COR #0 to CPU_COR #3 which are operation processing units. Therefore, the physical machine illustrated in FIG. 2 includes a total of eight CPU cores which are operation processing units. In the present embodiment, the number of CPUs and the number of CPU cores are not limited to these numbers.

The management apparatus 4 shares the same configuration as the physical machine illustrated in FIG. 2. The management apparatus 4 executes the management program 4_1 and causes the hypervisor HV of each physical machine to execute a startup (or boot) and a shut down, a pause and a resume, and the like of the virtual machine VM. Furthermore, the management apparatus 2 executes the management program 4_1 to configure the performance information collecting unit which monitors operating states of physical machines and virtual machines, a load calculation unit which calculates a virtual machine's CPU load, and the virtual machine arranging unit which, when needed, relocates a virtual machine from a physical machine to another physical machine or generates a new virtual machine in a physical machine.

In the case of the physical machines 1, 2, and 3, the large-capacity storage device 16 stores, for example, an OS, the hypervisor HV, and the like. In the case of the management apparatus 4, the large-capacity storage device 16 stores, for example, an OS, the management program 4_1, and the like. In addition, the OS and software stored in the large-capacity storage device 16 are expanded within the RAM 12 which is a memory and executed by each CPU core.

[Difference in Network Configurations of Virtual NIC]

Figure 3:
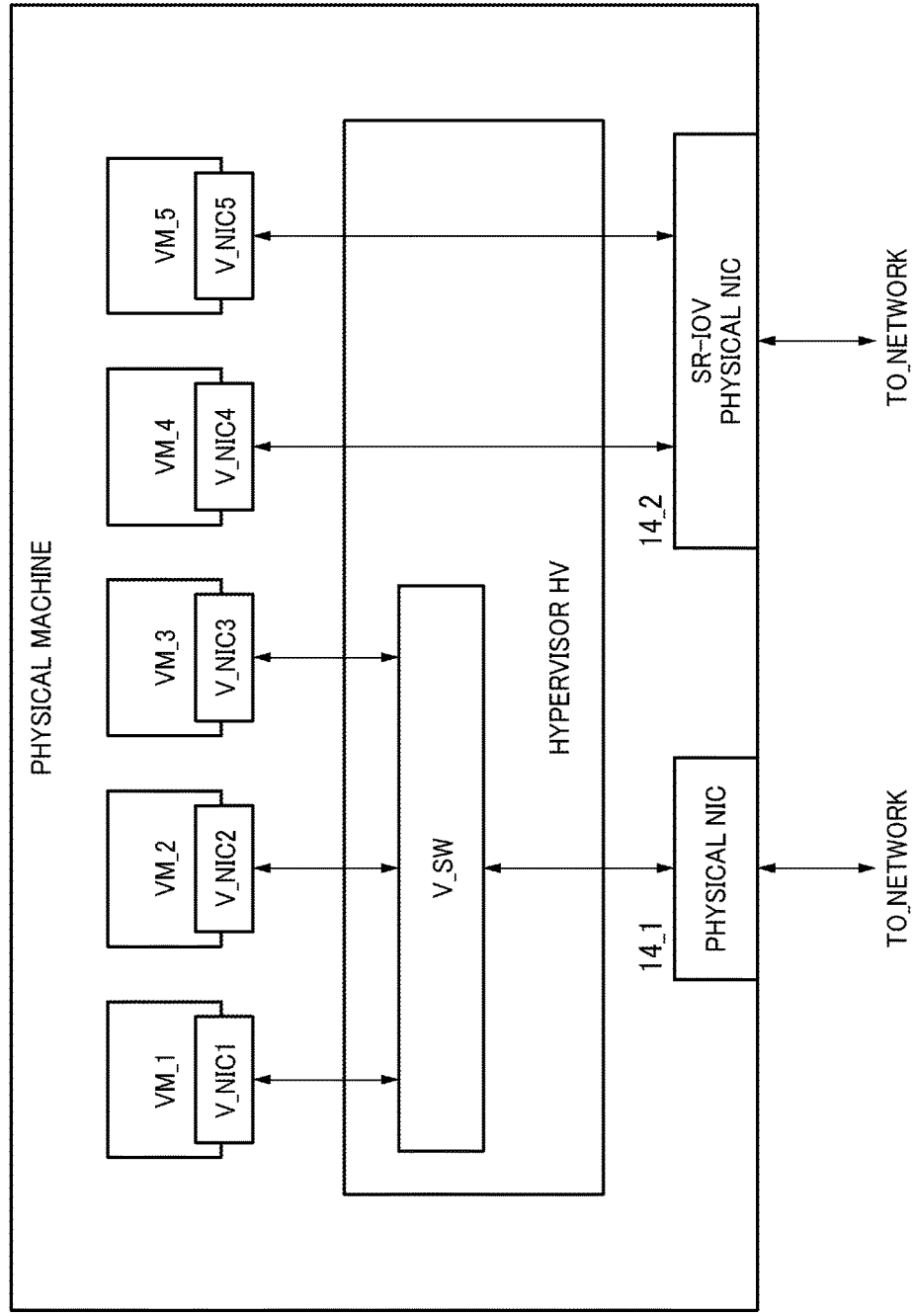
FIG. 3 is a diagram illustrating an example of connection between virtual NICs of virtual machines VM and physical NICs of a physical machine according to the present embodiment.

FIG. 3 is a diagram illustrating an example of connection between virtual NICs of virtual machines VM and physical NICs of a physical machine according to the present embodiment. In the example illustrated in FIG. 3, each of virtual machines VM_1 to VM_5 respectively include one virtual network interface (virtual NIC) V_NIC. All of the virtual NICs (V_NIC1 to V_NIC3) of the virtual machines VM_1 to VM_3 perform I/O data transmission with a physical NIC 14_1 via a virtual switch V_SW of the hypervisor HV. Meanwhile, the virtual NICs (V_NIC4 and V_NIC5) of the virtual machines VM_4 and VM_5 perform I/O data transmission with a physical NIC 14_2 without involving the virtual switch V_SW of the hypervisor HV. The physical NIC 14_2 is a physical NIC capable of SR-IOV and incorporates a function of a virtual switch by the hypervisor HV.

The virtual machines VM may include one or a plurality of virtual NICs. An IP address is respectively assigned to the virtual NICs and the virtual NICs execute I/O data transmission based on the respective IP addresses. The physical NIC 14_1 includes one internal terminal and performs I/O data transmission with a virtual NIC of a virtual machine via the virtual switch V_SW of the hypervisor HV. In addition, the physical NIC 14_1 includes one external terminal and is connected to an external network. However, by using the virtual switch V_SW of the hypervisor HV, the physical NIC 14_1 is capable of performs I/O data transmission with a plurality of virtual NICs.

The virtual switch V_SW of the hypervisor HV normally stores transmission packets received from virtual NICs of a plurality of virtual machines in a transmission queue for normal control (for non-priority control) and outputs the transmission packets to the physical NIC 14_1 on a FIFO basis. In addition, the virtual switch V_SW of the hypervisor HV stores a reception packet received from the physical NIC 14_1 in a reception queue for normal control and outputs the reception packet to a corresponding virtual NIC on a FIFO basis.

Therefore, when a virtual NIC set to a network configuration to the physical NIC 14_1 executes data transmission, processing of the virtual switch V_SW of the hypervisor occurs and a CPU load is generated accordingly.

Meanwhile, the SR-IOV-capable physical NIC 14_2 includes a plurality of internal terminals and each internal terminal performs I/O data transmission with a virtual NIC. The SR-IOV-capable physical NIC 14_2 includes one external terminal and is connected to an external network via the external terminal. Lines connecting the physical NIC 14_1, the SR-IOV-capable physical NIC 14_2, and the virtual NICs are virtual signal lines.

When a virtual NIC set to a network configuration to the SR-IOV-capable physical NIC 14_2 executes data transmission, processing of the virtual switch of the hypervisor does not occur and a CPU load corresponding to the processing of the virtual switch is not generated.

Furthermore, the virtual switch V_SW of the hypervisor HV includes a transmission queue for normal control (for non-priority control) and a transmission queue for priority control. In addition, the virtual switch stores a reception packet received from a virtual NIC set to a network configuration for priority control in the transmission queue for priority control and outputs the reception packet to the physical NIC 14_1 in preference to transmission packets in the transmission queue for normal control. In other words, when a transmission packet arrives at the transmission queue for priority control when transmission packets are stored only in the transmission queue for normal control, the virtual switch stops output of transmission packets from the transmission queue for normal control and transmits all of the transmission packets in the transmission queue for priority control to the physical NIC 14_1. At this point, a CPU interrupt occurs, the OS executes a CPU interrupt process, and saves a state of processing by the transmission queue for normal control in a memory. Subsequently, after an output process of the transmission packets in the transmission queue for priority control is completed, the OS restores the state of the output process of the transmission packets in the normal control transmission queue from the memory and resumes the output process by the normal control transmission queue.

Therefore, when a virtual NIC set to a network configuration for normal control (non-priority control) and a virtual NIC set to a network configuration for priority control coexist in virtual machines of a same physical machine, a CPU interrupt process and a transmission queue switching process occur in order to process transmission packets from the virtual NIC under priority control. Accordingly, a CPU load corresponding to the CPU interrupt and a CPU load corresponding to the switching of transmission queues are generated in the physical machine. In addition, when virtual NICs of virtual machines set to network configurations for normal control and priority control coexist, the number of CPU interrupts increases as a data transmission amount for priority control increases. Furthermore, a CPU load due to a data transmission process by a virtual NIC set to priority control is slightly larger than a CPU load due to a data transmission process by a virtual NIC set to normal control.

As described above, network configurations of virtual NICs of virtual machines include a first network configuration in which I/O data transmission is performed with the SR-IOV-capable physical NIC 14_2 without involving a hypervisor and a second network configuration in which I/O data transmission is performed with the physical NIC 14_1 via the hypervisor. In addition, the second network configuration includes a network configuration for normal control (for non-priority control) and a network configuration for priority control. In the present embodiment, the load calculation program determines a difference among these network configurations with respect to a virtual NIC, calculates a CPU load needed for I/O data transmission based on the network configuration of the virtual NIC of a virtual machine VM, and calculates a CPU load of the virtual machine VM.

Figure 4:
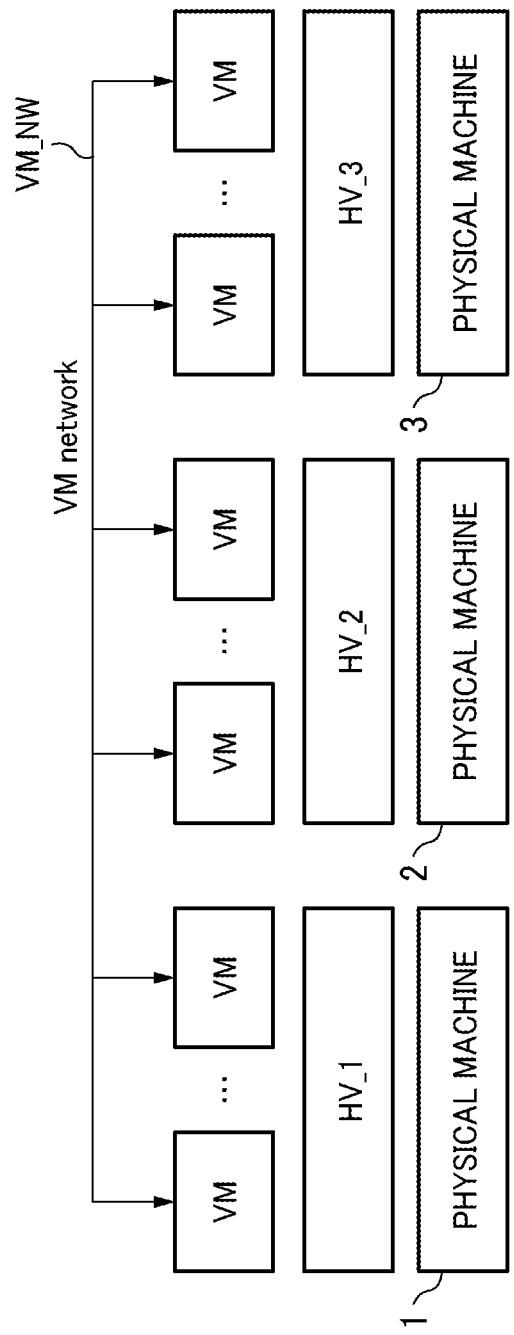
FIG. 4 is a diagram illustrating a relationship between physical machines and hypervisors according to the present embodiment.

FIG. 4 is a diagram illustrating a relationship between physical machines and hypervisors according to the present embodiment. For example, with private cloud computing, a virtual machine VM may be generated in a resource that combines various types of physical machines and hypervisors. In this case, since types of the respective hypervisors are wide-ranging, it is not easy to acquire a network configuration of a virtual NIC of a virtual machine. Therefore, there is no choice but to manually collect information on a network configuration of a virtual NIC of each virtual machine by a method corresponding to each hypervisor. Therefore, when the number of virtual machines increases, it is not easy to collect and manage newest network configurations of the respective virtual machines.

In consideration thereof, in the present embodiment, the load calculation program determines a network configuration of a virtual NIC of each virtual machine based on a CPU load of a physical machine, a CPU load of the virtual machine, the number of CPU interrupts of the physical machine, and an I/O data transmission amount of the virtual NIC of the virtual machine.

[Network Configuration of Virtual NIC of Virtual Machine to be Determined]

Assuming that a CPU load of a physical machine linearly increases or decreases in proportion to an I/O data transmission amount of a virtual NIC of a virtual machine, in the case of a virtual NIC set to the network configuration described below, an estimate of a CPU load due to I/O data transmission becomes inaccurate. Hereinafter, a CPU load due to I/O data transmission of a virtual NIC set to the following three network configurations will be described.

(1) A first network configuration in which I/O data transmission is performed without involving a hypervisor. In the case of this configuration, a virtual NIC of a virtual machine performs I/O data transmission directly with an SR-IOV-capable physical NIC.

(2) A second network configuration in which I/O data transmission is performed via a hypervisor. In the case of this configuration, a virtual NIC of a virtual machine performs I/O data transmission with a non-SR-IOV-capable physical NIC via a virtual switch of a hypervisor.

(2-1) A second network configuration in which priority control is performed by a virtual switch. Since a virtual switch performs priority control, a CPU interrupt occurs. This configuration will be referred to as the second network configuration for priority control.

(2-2) A second network configuration in which non-priority control (normal control) is performed by a virtual switch. Since a virtual switch performs non-priority control, a CPU interrupt does not occur. This configuration will be referred to as the second network configuration for non-priority control.

As described above, a virtual machine may use a single or a plurality of virtual NICs. In addition, a network configuration is set with respect to a virtual NIC. In other words, a determination of a network configuration must be performed for each virtual NIC. However, in the following examples, only cases where a virtual machine uses a single virtual NIC will be described. Therefore, in the following description, the network configuration of a virtual machine implies the network configuration of a single virtual NIC used by the virtual machine.

Example 1

FIG. 5 is a diagram illustrating an example (Example 1) where a virtual machine set to the second network configuration is added to a physical machine PM in which virtual machines set to the first network configuration have been generated. On a left side, the physical machine PM generates virtual machines VM1 and VM2, and the virtual machine VM1 is set to the second network configuration and performs I/O data transmission with a physical NIC via the hypervisor HV. In addition, the virtual machine VM2 is set to the first network configuration and performs I/O data transmission with a physical NIC (SR-IOV-capable physical NIC) without involving the hypervisor HV. In contrast, on a right side, a virtual machine VM3 set to the second network configuration is added to the physical machine PM. How an increase in CPU load of the physical machine PM due to the addition of the virtual machine VM3 should be estimated in such a case will now be described.

FIG. 6 is a diagram explaining estimation of a CPU load of a physical machine in the example illustrated in FIG. 5.

FIG. 6A illustrates estimation of a CPU load of a physical machine in a case where a CPU load is assumed to occur in proportion with an I/O data transmission amount. A graph on a left side represents time series data of a CPU load of the physical machine PM illustrated on the left side of FIG. 5, and a graph on a right side represents time series data of a CPU load of the physical machine PM illustrated on the right side of FIG. 5. In the graphs, horizontal axes represent time t and vertical axes represent CPU load. The CPU loads of the virtual machines VM1 and VM2 are illustrated overlapping one another while the CPU load of the physical machine is illustrated without modification.

In the graph on the left side, first, CPU loads are generated based on respective amounts of processing of the virtual machines VM1 and VM2. In addition, according to the assumption described above, the CPU loads are generated based on amounts of processing by a virtual switch of a hypervisor which accompanies I/O data transmission by the virtual machines VM1 and VM2. Therefore, an overhead OH1 of a CPU load obtained by subtracting a total CPU load of the virtual machines VM1 and VM2 from the total CPU load of the physical machine corresponds to processing by the hypervisor for I/O data transmission by the virtual machines VM1 and VM2.

Therefore, in the graph on the right side, due to the addition of the virtual machine VM3, CPU loads due to respective processing by the virtual machines VM1, VM2, and VM3 are generated and, according to the assumption described above, a CPU load OH2 is generated based on amounts of processing by a virtual switch of a hypervisor which accompanies I/O data transmission by the virtual machines VM1, VM2, and VM3. In other words, by adding the virtual machine VM3, the overhead OH2 of a CPU load due to I/O data transmission by the virtual machines is presumed to increase as follows with respect to the CPU load OH1 prior to the addition of the virtual machine VM3.

$$OH2=OH1*(\text{data amounts of VM1+VM2+VM3})/(\text{data amounts of VM1+VM2}) \quad (1)$$

Therefore, according to the assumption described above, an increase in the CPU load of the physical machine PM after the addition of the virtual machine VM3 is estimated as the CPU load due to processing by the virtual machine VM3, i.e. OH1*(data amount of VM3)/(data amounts of VM1+VM2).

However, as illustrated in FIG. 5, in the physical machine PM prior to the addition of the virtual machine VM3, the virtual machine VM1 set to the second network configuration in which I/O data transmission is performed via a hypervisor and the virtual machine VM2 set to the first network configuration in which I/O data transmission is performed without involving a hypervisor have been generated. Therefore, the overhead OH1 of a CPU load on the left side of FIG. 6A does not include a CPU load due to I/O data transmission by the virtual machine VM2.

FIG. 6B illustrates estimation of an actual CPU load of a physical machine. In the graph on a left side of FIG. 6B, an overhead OH3 of a CPU load of the physical machine PM includes only a CPU load due to processing of a virtual switch by a hypervisor for I/O data transmission by the virtual machine VM1 and does not include that of the virtual machine VM2. In addition, an overhead OH4 of a CPU load of the physical machine PM after adding the virtual machine VM3 illustrated in the graph on a right side is a CPU load due to processing of a virtual switch for I/O data transmission by the virtual machines VM1 and VM3. Accordingly, the overhead OH4 of the CPU load is presumed to increase as follows.

$$OH4=OH3*(\text{data amounts of VM1+VM3})/(\text{data amount of VM1}) \quad (2)$$

In other words, an actual increase in the CPU load of a physical machine is a CPU load with respect to processing by the virtual machine VM3 and OH3*(data amount of VM3)/(data amount of VM1). In conclusion, the increase in CPU load in the case of FIG. 6A is smaller than the actual increase in CPU load illustrated in FIG. 6B. When a predicted increase in the CPU load of a physical machine is small, a CPU utilization rate of the physical machine after the addition of the virtual machine VM3 may exceed 100% and delays may occur in the processing by the virtual machines VM1 to VM3.

Example 2

FIG. 7 is a diagram illustrating an example (Example 2) where a virtual machine set to the first network configuration is added to a physical machine PM in which virtual machines set to the second network configuration have been generated. On a left side, the physical machine PM generates virtual machines VM1 and VM2, and the virtual machines VM1 and VM2 are set to the second network configuration and perform I/O data transmission with a physical NIC via the hypervisor HV. In contrast, on a right side, a virtual machine VM3 set to the first network configuration is added to the physical machine PM. How an increase in CPU load of the physical machine PM should be estimated in such a case will now be described.

FIG. 8 is a diagram explaining estimation of a CPU load of a physical machine in the example illustrated in FIG. 7.

Figure 8A:
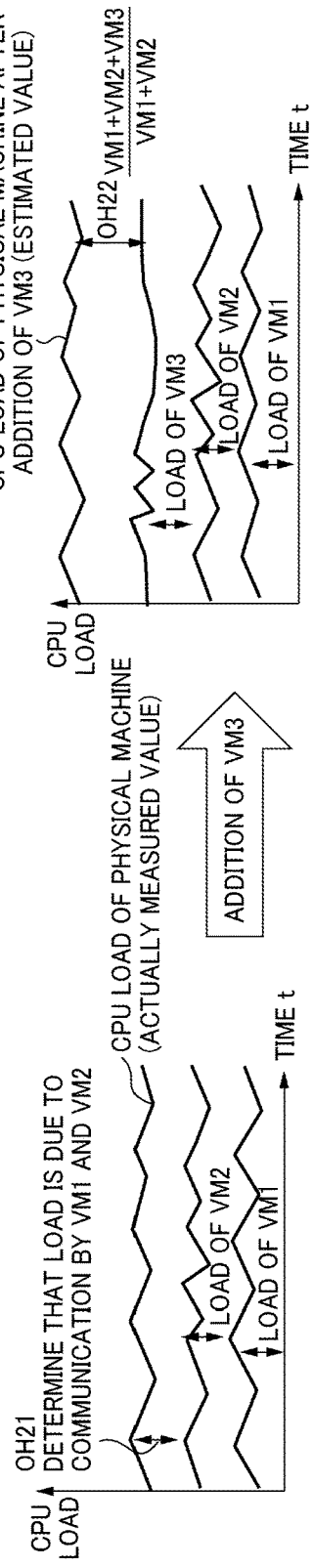
FIGS. 8A and 8B are diagrams explaining estimation of a CPU load of a physical machine in the example illustrated in FIG. 7.

FIG. 8A illustrates estimation of a CPU load of a physical machine in a case where a CPU load is assumed to occur in proportion with an I/O data transmission amount. A graph on a left side represents time series data of a CPU load of the physical machine PM illustrated on the left side of FIG. 7, and a graph on a right side represents time series data of the physical machine PM illustrated on the right side of FIG. 7. In the graphs, similarly, horizontal axes represent time t and vertical axes represent CPU load. The CPU loads of the virtual machines VM1 and VM2 are illustrated overlapping one another while the CPU load of the physical machine is illustrated without modification.

In the graph on the left side, first, CPU loads are generated based on respective amounts of processing of the virtual machines VM1 and VM2. In addition, an overhead OH21 of a CPU load obtained by subtracting a total CPU load of the virtual machines VM1 and VM2 from the total CPU load of the physical machine corresponds to processing by the hypervisor for I/O data transmission by the virtual machines VM1 and VM2.

In the graph on the right side, due to the addition of the virtual machine VM3, CPU loads due to respective processing by the virtual machines VM1, VM2, and VM3 are generated and, according to the assumption described above, an overhead OH22 of a CPU load is generated based on amounts of processing by a virtual switch of a hypervisor which accompanies I/O data transmission by the virtual machines VM1, VM2, and VM3. In other words, by adding the virtual machine VM3, the overhead OH22 of a CPU load due to I/O data transmission by the virtual machines is presumed to increase as follows with respect to the CPU load OH21 prior to the addition of the virtual machine VM3.

$$OH22=OH21*(\text{data amounts of VM1+VM2+VM3})/ (\text{data amounts of VM1+VM2}) \quad (3)$$

Therefore, according to the assumption described above, an increase in the CPU load of the physical machine PM after the addition of the virtual machine VM3 is estimated as the CPU load due to processing by the virtual machine VM3 and OH21*(data amount of VM3)/(data amounts of VM1+VM2).

However, as illustrated in FIG. 7, in the physical machine PM prior to the addition of the virtual machine VM3, the virtual machines VM1 and VM2 set to the second network configuration in which I/O data transmission is performed via a hypervisor have been generated. In addition, in the physical machine PM after the addition of the virtual machine VM3, the virtual machine VM3 set to the first network configuration in which I/O data transmission is performed without involving a hypervisor has been newly generated. Therefore, the overhead OH22 of a CPU load on the right side of FIG. 8A should not include a CPU load due to I/O data transmission by the virtual machine VM3.

Figure 8B:
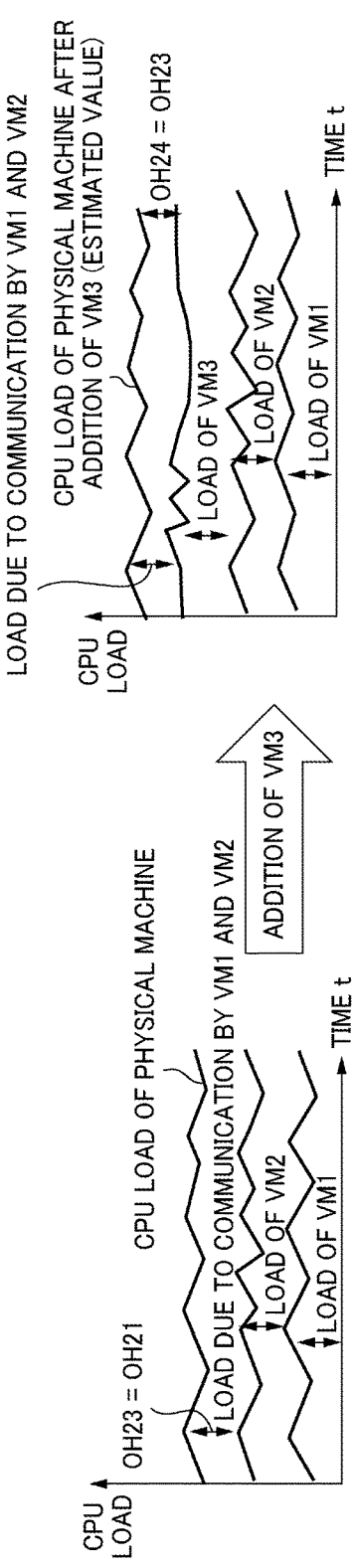

FIG. 8B illustrates estimation of an actual CPU load of a physical machine. In the graph on a left side of FIG. 8B, an overhead OH23 of a CPU load of the physical machine PM includes CPU loads due to processing of a virtual switch by a hypervisor for I/O data transmission by the virtual machines VM1 and VM2. In addition, an overhead OH24 of a CPU load of the physical machine PM after adding the virtual machine VM3 illustrated in the graph on a right side remains OH23, a CPU load due to processing of a virtual switch for I/O data transmission by the virtual machines VM1 and VM2. An increase in CPU load due to the added virtual machine VM3 does not occur. Therefore, the overhead OH24 of the CPU load is presumed not to fluctuate.

In other words, an actual increase in the CPU load of the physical machine is limited to a CPU load with respect to processing by the virtual machine VM3 and a CPU load due to I/O data transmission by the virtual machine VM3 does not occur. In conclusion, the increase in CPU load in the case of FIG. 8A is larger than the actual increase in CPU load illustrated in FIG. 8B. Therefore, in the estimate of a CPU load illustrated in FIG. 8A, a margin in CPU processing capability is created in the physical machine PM after adding the virtual machine VM3. The margin constitutes excess hardware resources. Excess hardware resources cause an aggregation rate of virtual machines VM to decline and unnecessarily increase the number of physical machines.

Example 3

Figure 9:
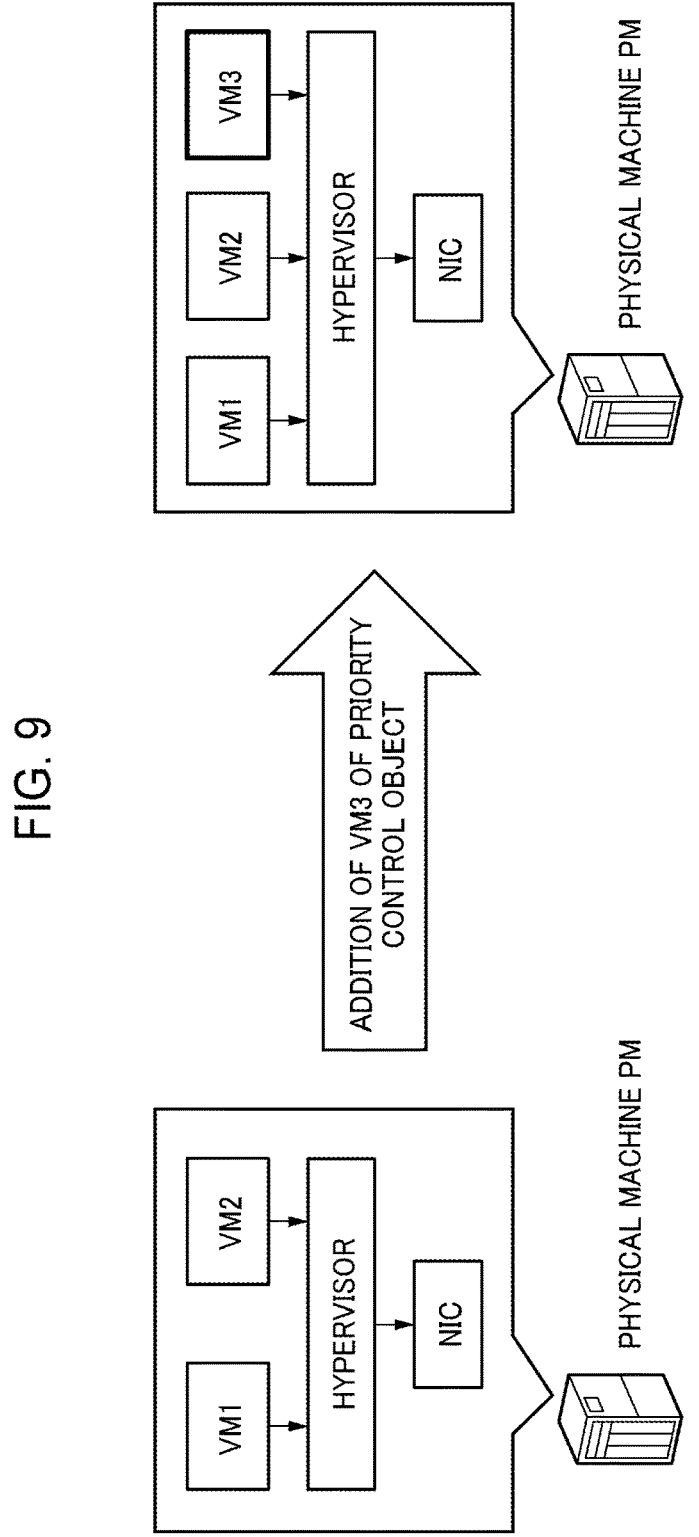
FIG. 9 is a diagram illustrating an example (Example 3) where a virtual machine set to the second network configuration for priority control is added to a physical machine PM in which virtual machines set to the second network configuration for non-priority control have been generated.

FIG. 9 is a diagram illustrating an example (Example 3) where a virtual machine set to the second network configuration for priority control is added to a physical machine PM in which virtual machines set to the second network configuration for non-priority control have been generated. On a left side, the physical machine PM generates virtual machines VM1 and VM2, and the virtual machines VM1 and VM2 are set to the second network configuration for non-priority control and perform I/O data transmission with a physical NIC via the hypervisor HV. In contrast, on a right side, a virtual machine VM3 set to the second network configuration for priority control is added to the physical machine PM. How an increase in CPU load of the physical machine PM should be estimated in such a case will now be described.

FIG. 10 is a diagram explaining estimation of a CPU load of a physical machine in the example illustrated in FIG. 9.

FIG. 10A illustrates estimation of a CPU load of a physical machine in a case where a CPU load is assumed to occur in proportion with an I/O data transmission amount. A graph on a left side represents time series data of a CPU load of the physical machine PM illustrated on the left side of FIG. 9, and a graph on a right side represents time series data of a CPU load of the physical machine PM illustrated on the right side of FIG. 9. In the graphs, similarly, horizontal axes represent time t and vertical axes represent CPU load. The CPU loads of the virtual machines VM1 and VM2 are illustrated overlapping one another while the CPU load of the physical machine is illustrated without modification.

In the graph on the left side, first, CPU loads are generated based on respective amounts of processing of the virtual machines VM1 and VM2. In addition, a CPU load OH31 obtained by subtracting a total CPU load of the virtual machines VM1 and VM2 from the total CPU load of the physical machine corresponds to processing (non-priority control) by the hypervisor for I/O data transmission by the virtual machines VM1 and VM2.

In the graph on the right side, due to the addition of the virtual machine VM3, CPU loads due to respective processing by the virtual machines VM1, VM2, and VM3 are generated and, according to the assumption described above, a CPU load OH32 is generated based on amounts of processing of a virtual switch by a hypervisor which accompanies I/O data transmission by the virtual machines VM1, VM2, and VM3. In other words, by adding the virtual machine VM3, the overhead OH32 of a CPU load due to I/O data transmission by the virtual machines is presumed to increase as follows with respect to the CPU load OH31 prior to the addition of the virtual machine VM3.

$$OH32=OH31*(\text{data amounts of VM1+VM2+VM3})/ (\text{data amounts of VM1+VM2}) \quad (4)$$

Therefore, according to the assumption described above, an increase in the CPU load of the physical machine PM after the addition of the virtual machine VM3 is estimated as the CPU load due to processing by the virtual machine VM3. i.e. OH31*(data amount of VM3)/(data amounts of VM1+VM2).

However, as illustrated in FIG. 9, in the physical machine PM prior to the addition of the virtual machine VM3, the virtual machines VM1 and VM2 set to the second network configuration for non-priority control in which I/O data transmission is performed via a hypervisor have been generated. In addition, in the physical machine PM after the addition of the virtual machine VM3, the virtual machine VM3 set to the second network configuration for priority control in which I/O data transmission is performed via a hypervisor has been generated. Therefore, the overhead OH32 of a CPU load on the right side of FIG. 10A must include a CPU load due to I/O data transmission involving priority control by the hypervisor of the virtual machine VM3. In addition, a CPU load in the case of priority control is larger than a CPU load in the case of normal control (non-priority control).

FIG. 10B illustrates estimation of an actual CPU load of a physical machine. In the graph on a left side of FIG. 10B, an overhead OH33 of a CPU load of the physical machine PM includes CPU loads due to processing of a virtual switch (non-priority control) by a hypervisor for I/O data transmission by the virtual machines VM1 and VM2. In addition, an overhead OH34 of a CPU load of the physical machine PM after adding the virtual machine VM3 illustrated in the graph on a right side includes a CPU load due to processing of a virtual switch (non-priority control) for I/O data transmission by the virtual machines VM1 and VM2 and a CPU load due to processing of a virtual switch (priority control) by the virtual machine VM3. Furthermore, when virtual machines set to the second network configuration for non-priority control and virtual machines set to the second network configuration for priority control coexist, a process of a CPU interrupt that accompanies priority control and a process of switching between a transmission queue for normal control (for non-priority control) and a transmission queue for priority control additionally occur. Therefore, an increase of overhead of a CPU load due to the addition of the virtual machine VM3 is larger than that of a CPU load according to the assumption.

In other words, by adding the virtual machine VM3, the overhead OH34 of a CPU load due to I/O data transmission by the virtual machines is presumed to increase as follows with respect to the CPU load OH33 prior to the addition of the virtual machine VM3.

$$OH34=OH33*(\text{data amounts of VM1+VM2+VM3}+\text{extra(or plus alpha)})/(\text{data amounts of VM1+VM2}) \quad (5)$$

As described above, an actual increase in the CPU load of the physical machine includes a CPU load with respect to processing by the virtual machine VM3 and a CPU load with respect to processing for priority control by a virtual switch which accompanies I/O data transmission by the virtual machine VM3. In conclusion, the increase in CPU load in the case of FIG. 10A is smaller than the actual increase in CPU load illustrated in FIG. 10B. Therefore, when a CPU load is estimated according to the assumption described earlier, a CPU utilization rate of the physical machine PM after the addition of the virtual machine VM3 may exceed 100% and delays may occur in the processing by the virtual machines.

Summary of Examples 1, 2, and 3

FIG. 11 is a diagram illustrating fluctuations in an overhead of a CPU load of a physical machine in Examples 1, 2, and 3. In the graphs in FIG. 11, horizontal axes represent an I/O data transmission amount of all virtual machines VM of a physical machine B, and vertical axes represent an overhead OH of a CPU load obtained by subtracting a CPU load needed for processing by the virtual machines VM from a CPU load of the physical machine (a CPU load needed for I/O data transmission by the virtual machines VM).

As illustrated in FIG. 11, it is assumed that a virtual machine VM3 having been generated at the physical machine A is relocated (or migrated) to the physical machine B. In other words, in a similar manner to the Examples 1, 2, and 3, a fluctuation of the overhead OH of a CPU load of a physical machine in a case where the virtual machine VM3 is added to the physical machine B is illustrated.

When the added virtual machine VM3 is set to the second network configuration for non-priority control as in the case of Example 1, an increase in the overhead OH of the CPU load which accompanies I/O data transmission at the physical machine B after the relocation is approximately an increase proportional to an I/O data transmission amount of the virtual machine VM3.

In addition, when the added virtual machine VM3 is set to the first network configuration not involving a virtual switch of a hypervisor as in the case of Example 2, an increase in the overhead OH of the CPU load which accompanies I/O data transmission at the physical machine B after the relocation does not occur.

Furthermore, when the virtual machine VM3 set to the second network configuration for priority control is added to a physical machine at which a virtual machine set to the second network configuration for non-priority control has been generated as in the case of Example 3, an increase in the overhead OH of the CPU load which accompanies I/O data transmission at the physical machine B after the relocation is added as an extra (plus alpha) to an increase proportional to an I/O data transmission amount of the virtual machine VM3 plus extra (plus alpha). This is because the CPU load in the case of priority control is slightly larger (extra or plus x) than the case of non-priority control.

[Load Calculation Program According to Present Embodiment]

Figure 12:
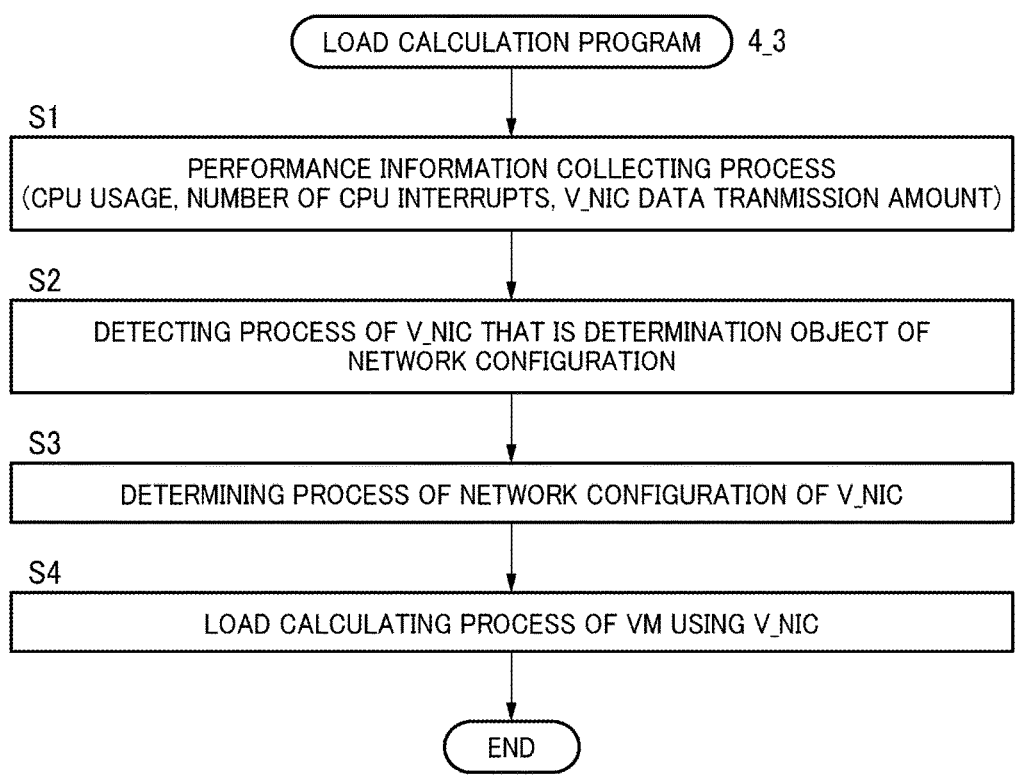
FIG. 12 is a flow chart illustrating schematic processes of the load calculation program according to the present embodiment.

FIG. 12 is a flow chart illustrating schematic processes of the load calculation program according to the present embodiment. The load calculation program 4_3 is included in the management program 4_1 executed by the management apparatus 4 illustrated in FIG. 1.

[Performance Information Collecting Process S1]

By executing the load calculation program 4_3, the management apparatus 4 performs a performance information collecting process S1 for collecting performance information of physical machines and virtual machines. In the performance information collecting process S1, the management apparatus 4 periodically (for example, every 10 minutes) collects time-series performance information with respect to physical machines PM and virtual machines VM that are objects of operation administration. In addition, in the performance information collecting process S1, the management apparatus 4 may periodically collect configuration information with respect to physical machines PM and virtual machines VM that are objects of operation administration. Instead of having the management apparatus 4 periodically collect configuration information, every time the physical machine PM is arranged (or deployed) and every time the physical machine starts up or generates the virtual machine VM, respective pieces of configuration information may be stored in a database.

Examples of configuration information are as follows.
(1) A physical NIC of a physical machine and an IP address thereof
(2) A virtual NIC of a virtual machine and an IP address thereof Examples of performance information are as follows.
(1) A CPU load (for example, CPU usage amount or a CPU utilization rate) of a physical machine, the number of CPU interrupts, and the number of transmission bytes and the number of reception bytes (I/O data transmission amount) for each physical NIC
(2) A CPU load (for example, CPU usage amount or a CPU utilization rate) of a virtual machine and the number of transmission bytes and the number of reception bytes (I/O data transmission amount) for each virtual NIC The configuration information and the performance information presented above will now be described by way of examples. In addition, tables of databases other than configuration information and performance information will be described.

FIG. 23 is an example of a physical machine list table included in a configuration information database (DB). In the example illustrated in FIG. 23, management IDs and physical machine names (HostA to HostC) of physical machines A, B, and C corresponding to the management IDs are associated with each other.

FIG. 24 is an example of a virtual machine VM list table included in the configuration information database (DB). In the example illustrated in FIG. 24, management IDs, virtual machine names (VM1 to VM12) of virtual machines VM1 to VM12 corresponding to the management IDs, and physical machine names (HostA to HostC) are associated with each other.

FIG. 25 is a diagram illustrating an example of a network configuration table included in a network configuration information database (DB). In FIG. 25, virtual NICs of virtual machines VM1 and VM2, network configurations, and network configuration determination dates and times are associated with each other. By referring to this table, for which virtual NIC of which virtual machine a network configuration has been already determined or a network configuration is yet to be determined can be learned.

FIG. 26 is a diagram illustrating an example of a threshold monitoring setting table included in a monitoring setting database (DB). In FIG. 26, physical machines HostA to HostC and virtual machines VM1 to VM3 and respective threshold monitoring setting dates and times are associated with each other. By referring to this table, a threshold setting date and time for monitoring a state of each physical machine and each virtual machine can be learned.

FIG. 27 is an example of a network interface (physical NIC and virtual NIC (V_NIC)) list table included in the configuration information database (DB). In the example illustrated in FIG. 27, physical NIC names of physical machines Host and IP addresses thereof, and virtual NIC names of virtual machines VM and IP addresses thereof, are respectively associated with each other. Even when a physical NIC of a physical machine and a virtual NIC of a virtual machine have the same name, the NICs are recognized as different NICs if the NICs belong to a different physical machine and a different virtual machine.

FIG. 28 is a diagram illustrating an example of a transmission volume (I/O data transmission amount) table of virtual NICs of virtual machines and an example of a CPU load (CPU usage) table of physical machines and virtual machines which are included in a performance information database (DB). The virtual NIC transmission volume table stores, in a time series, a transmission volume per unit time of virtual NICs of the virtual machines VM1 and VM2 as measured every 10 minutes. In a similar manner, the CPU load table of physical machines and virtual machines stores, in a time series, a CPU load (CPU usage) per unit time of each of the physical machines HostA to HostC and virtual machines VM1 to VM3. However, CPU usage at different times has been omitted.

FIG. 29 is a diagram illustrating an example of a CPU interrupt table of physical machines included in the performance information database (DB) and an example of the network configuration information database (DB). The physical machine CPU interrupt table stores the number of CPU interrupts per unit time at a given time at the physical machines HostA to HostC. However, the numbers of CPU interrupts at different times have been omitted. In addition, the network configuration information DB illustrates a ratio of a CPU load when a hypervisor performs priority control to a CPU load when the hypervisor performs non-priority control (CPU load under priority control/CPU load under non-priority control) at the physical machines HostA to HostC.

Among the databases illustrated in FIGS. 23 to 29 described above, databases related to the performance information collecting process S1 illustrated in FIG. 12 are those illustrated in FIGS. 23, 24, 27, and 28 as well as the physical machine CPU interrupt table illustrated in FIG. 29. Other databases will be referred to in the processes to be described later.

Returning now to FIG. 12, in the performance information collecting process S1, respective CPU usage amount of the physical machines and the virtual machines, the number of CPU interrupts at the physical machines, and an I/O data transmission amount of a virtual NIC (V_NIC) used by each virtual machine are collected in a time series. The respective CPU usage amount of the physical machines and the virtual machines may be acquired via the OS from a value of a counter inside the CPU chip. Alternatively, the CPU usage of a virtual machine may be acquired from, for example, a hypervisor or from a monitoring program executed by the virtual machine. In addition, the number of CPU interrupts at the physical machines may also be acquired via the OS from a value of a counter inside the CPU chip. Furthermore, the I/O data transmission amount of each virtual NIC may be acquired from, for example, a hypervisor or from a monitoring program executed by the virtual machines.

In FIG. 12, next, the load calculation program 4_3 performs a detecting process of a virtual NIC (V_NIC) that is an object of determination of a network configuration (S2). The network configuration of a virtual NIC used by a virtual machine may change from time to time. Therefore, a change in the network configuration of a virtual NIC is detected by some means and the virtual NIC whose network configuration has been changed is newly set as a determination object. Details will be provided later.

Subsequently, the load calculation program 4_3 performs a determining process of a network configuration of the virtual NIC (V_NIC) that is a determination object (S3). As described earlier, the determination of the network configuration of the virtual NIC is performed by distinguishing among the first network configuration in which I/O data transmission is performed with a physical NIC (an SR-IOV-capable physical NIC) without involving a hypervisor, the second network configuration for priority control in which I/O data transmission is performed with a physical NIC under priority control via a hypervisor, and the second network configuration for non-priority control in which I/O data transmission is performed with a physical NIC under non-priority control via a hypervisor. Details will be provided later.

Finally, based on determined network configurations of virtual NICs, a CPU load of the virtual machine VM using each virtual NIC is calculated, and a CPU load of a physical machine which starts up, generates, or deletes the virtual machine is calculated (S4).

Hereinafter, the detecting process S2 of a virtual NIC that is a network configuration determination object, the network configuration determining process S3 of a virtual NIC, and a load calculating process S4 of a virtual machine of the load calculation program 4_3 will be respectively described.

[Detecting Process S2 of Virtual NIC that is Network Configuration Determination Object]

Figure 13:
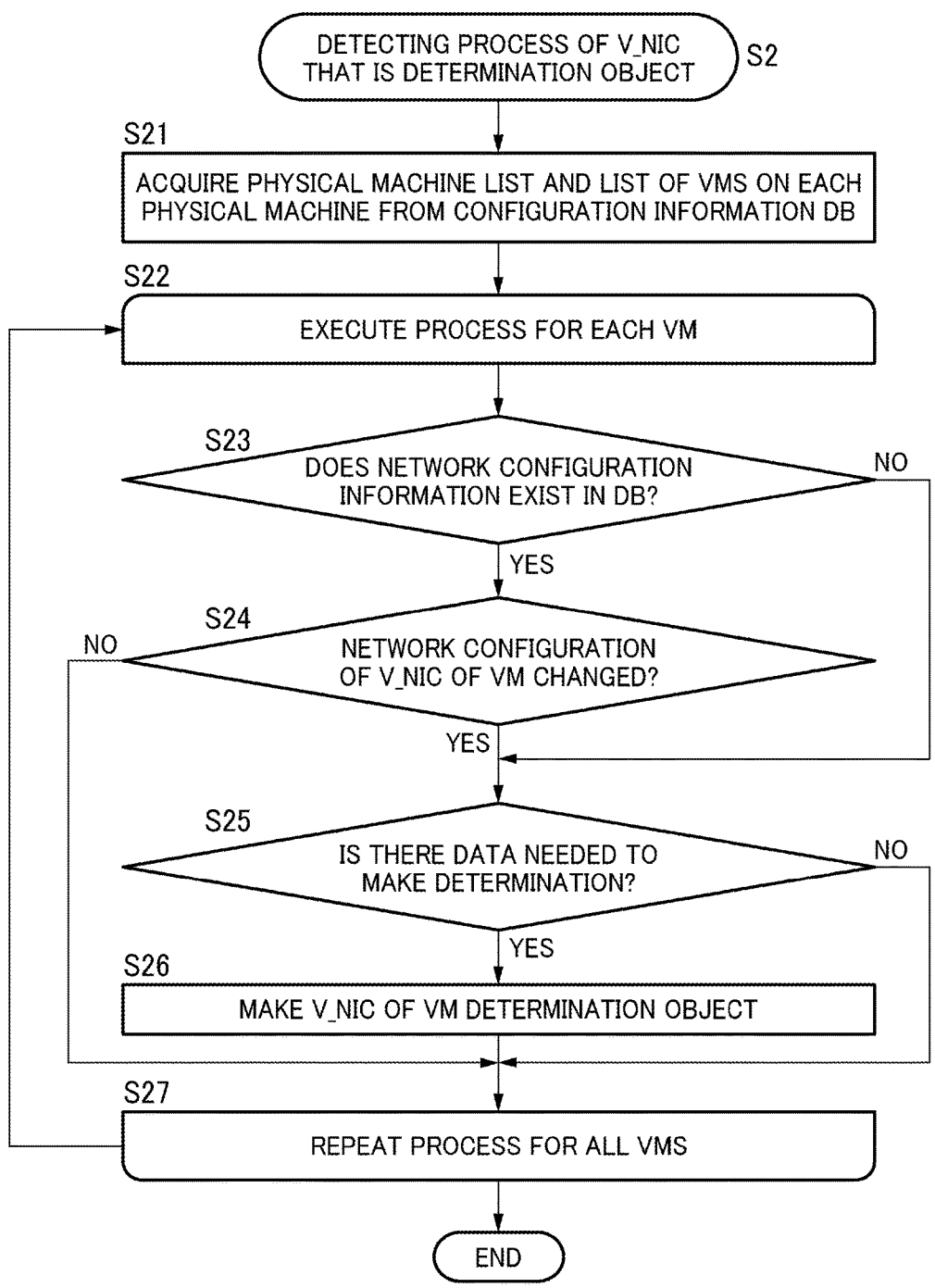
FIG. 13 is a flow chart of the detecting process S2 of a virtual NIC that is a network configuration determination object.

FIG. 13 is a flow chart of the detecting process S2 of a virtual NIC that is a network configuration determination object. According to the flow chart illustrated in FIG. 13, first, the load calculation program 4_3 acquires a physical machine list and a list of virtual machines VM on each physical machine from the configuration information DB (S21). In other words, the load calculation program 4_3 acquires the physical machine list table and the VM list table illustrated in FIGS. 23 and 24. Subsequently, the following processes (S22 to S27) are repetitively executed for each virtual machine VM.

First, the load calculation program refers to the network configuration table illustrated in FIG. 25 and checks whether or not a network configuration exists for the virtual NIC of the virtual machine that is a determination object (S23). If a network configuration does not exist, the virtual NIC becomes a determination object (NO in S23). If a network configuration exists (YES in S23), the load calculation program checks whether or not the network configuration of the already-determined virtual NIC has been subsequently changed (S24). When there is a possibility that the network configuration of the already-determined virtual NIC has been subsequently changed (YES in S24), the virtual NIC becomes a determination object.

At this point, a determination of whether or not there is a possibility that the network configuration of the already-determined virtual NIC has been changed is performed as follows. In a case where the network configuration of the virtual NIC of the virtual machine VM had been changed from the operation administrator terminal 7 at a data center, when the change has been notified to the management apparatus 4, if a date and time of change of the network configuration is after the network configuration determination date and time in the network configuration table (FIG. 25), the virtual NIC becomes a determination object.

However, there may be cases where the change made to the network configuration of the virtual NIC is not notified to the management apparatus 4. In such a case, normally, when the operation administrator changes the network configuration of the virtual NIC, the operation administrator normally changes a threshold of a monitoring object where the virtual machine VM or the physical machine is located in order to monitor a state resulting from the change to the network configuration. The date and time when this threshold is set are to be used. In other words, when the threshold monitoring setting date and time in the threshold monitoring setting table (FIG. 26) is after the network configuration determination date and time in the network configuration table (FIG. 25), the load calculation program makes the virtual NIC a determination object.

Next, the load calculation program checks whether or not data needed for determining the network configuration of the virtual NIC exists (S25). Conditions for the existence of data needed to determine the network configuration of the virtual NIC are as follows.

(1) Time series data of a transmission volume (I/O data transmission amount) of each virtual NIC of virtual machines on the same physical machine having generated the virtual machine of the virtual NIC that is the determination object. However, a needed number of samples with different ratios of the transmission volumes (I/O data transmission amounts) of the respective virtual NICs need to exist. The needed number of samples is equal to or greater than (at least equal to) the number of virtual NICs. This is needed in order to satisfy the simultaneous equation described later.

(2) Time series data of a CPU load (CPU usage) of all virtual machines on the same physical machine having generated the virtual machine of the virtual NIC that is the determination object and a CPU load (CPU usage) of the physical machine.

(3) Time series data of the number of CPU interrupts of the physical machine of the virtual machine of the virtual NIC that is the determination object.

Furthermore, with respect to (1), sums of transmission volumes (I/O data transmission amounts) of virtual NICs of all virtual machines on the physical machine are desirably equal among samples. This is because when an overflow of packets occurs in a transmission queue in accordance with an I/O data transmission amount, a prescribed exchange takes place between the virtual machine VM and the hypervisor HV and an overhead in the CPU load is generated. Keeping an overhead of the CPU load which is needed when an overflow of packets occurs in a transmission queue equal among samples enables determinations to be made with high accuracy.

The conditions for the existence of data needed to determine the network configuration of the virtual NIC presented above will be described again later.

Returning now to FIG. 13, when data needed to determine the network configuration exists (YES in S25), the load calculation program makes the virtual NIC of the virtual machine VM a network configuration determination object (S26). The processes (S22 to S27) described above are repetitively performed for all virtual machines VM.

[Network Configuration Determining Process S3 of Virtual NIC]

Figure 14:
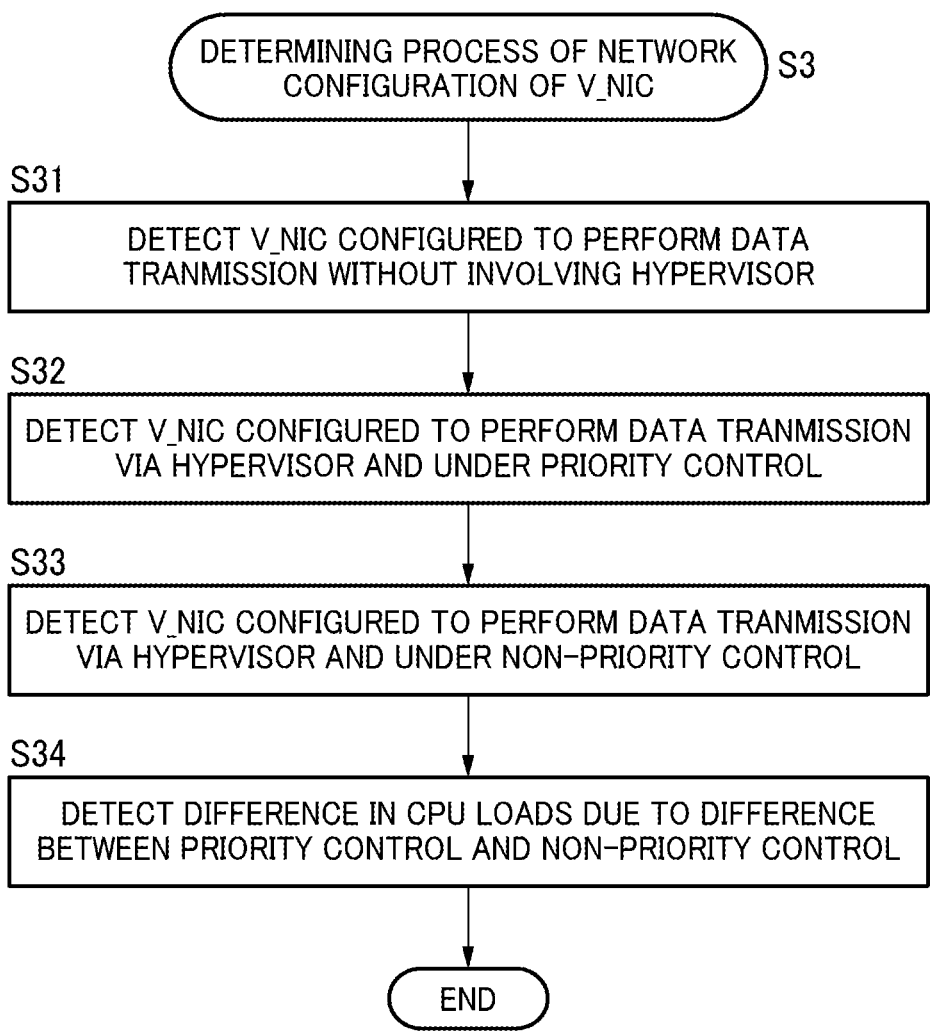
FIG. 14 is a flow chart of a determination process of a network configuration of a virtual NIC (V_NIC)

FIG. 14 is a flow chart of a determination process of a network configuration of a virtual NIC (V_NIC). The determination process of a network configuration of a virtual NIC is summarized as follows. First, the load calculation program detects a virtual NIC (V_NIC) configured to perform I/O data transmission without involving a hypervisor (first network configuration) among the virtual NICs of virtual machines generated on the same physical machine (S31). The detecting process is performed based on a correlation between an I/O data transmission amount of each virtual NIC and an overhead of a CPU load (CPU usage) of a physical machine obtained by subtracting CPU loads (CPU usage) of all virtual machines from the total CPU load (CPU usage) of the physical machine. A determination of the first network configuration is made for virtual NICs without correlation. A determination of the second network configuration is made for virtual NICs having correlation.

Next, the load calculation program detects a virtual NIC (V_NIC) configured to perform I/O data transmission via a hypervisor and under priority control (second network configuration for priority control) among the virtual NICs of virtual machines generated on the same physical machine (S32). The detecting process is performed by excluding virtual NICs set to the first network configuration and based on a correlation between an I/O data transmission amount of each virtual NIC set to the second network configuration and the number of CPU interrupts of the physical machine. A determination of the second network configuration for priority control is made for virtual NICs having a large correlation.

Furthermore, at the same time as the detection of virtual NICs set to the second network configuration for priority control in step S32 described above, the load calculation program detects virtual NICs set to the second network configuration for non-priority control (S33). In this detecting process, a determination of the second network configuration for non-priority control is made for virtual NICs whose correlation described above is small.

Finally, the load calculation program detects a difference in CPU loads (CPU usage) of virtual NICs due to a difference between priority control and non-priority control (S34). Based on this difference, the load calculation program detects a ratio of a CPU load of a virtual NIC set to the second network configuration for priority control to a CPU load of a virtual NIC set to the second network configuration for non-priority control. This ratio represents a difference between a CPU load under priority control and a CPU load under non-priority control.

Hereinafter, the processes S31, S32/S33, and S34 will be described in detail.

[Process S31 of Detecting Virtual NIC (V_NIC) Configured to Perform I/O Data Transmission without Involving Hypervisor (First Network Configuration)]

Figure 15:
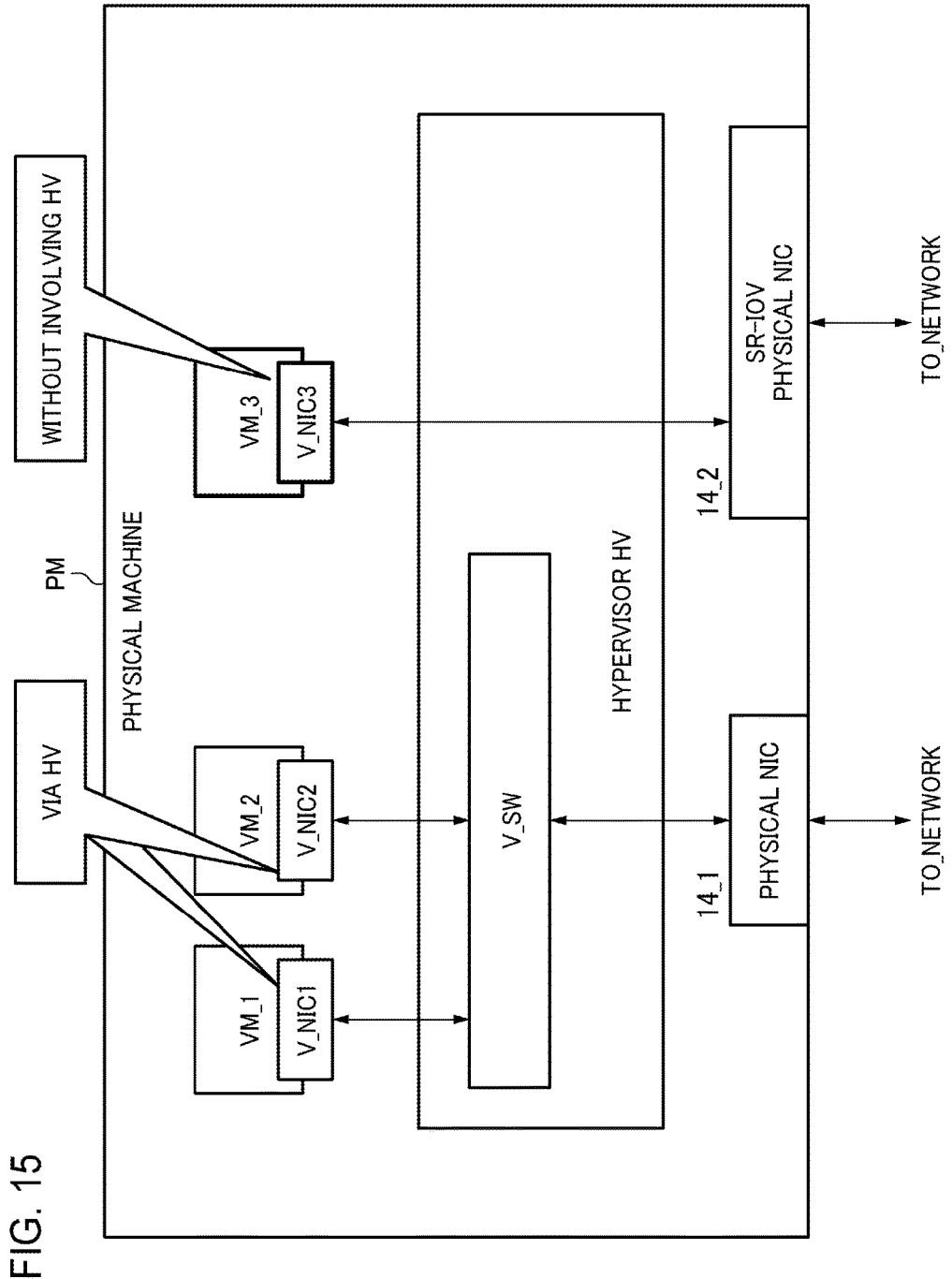
FIG. 15 is a diagram illustrating an example of a relationship between a physical machine and virtual machines in a process of detecting a virtual NIC set to the first network configuration.

FIG. 15 is a diagram illustrating an example of a relationship between a physical machine and virtual machines in a process of detecting a virtual NIC set to the first network configuration. Virtual machines VM1, VM2, and VM3 are generated on a physical machine PM illustrated in FIG. 15. In addition, the virtual machine VM1 uses a virtual NIC (V_NIC1) and the virtual machines VM2 and VM3 use virtual NICs (V_NIC2 and V_NIC3). Furthermore, the virtual NIC (V_NIC1) of the virtual machine VM1 and the virtual NIC (V_NIC2) of the virtual machine VM2 are set to the second network configuration in which I/O data transmission is performed via a hypervisor. Moreover, the virtual NIC (V_NIC3) of the virtual machine VM3 is set to the first network configuration in which I/O data transmission is performed without involving a hypervisor.

Accordingly, the virtual NICs (V_NIC1 and V_NIC2) perform I/O data transmission with the physical NIC 14_1 via a hypervisor and the virtual NIC (V_NIC3) performs I/O data transmission with the SR-IOV-capable physical NIC 14_2 without involving a hypervisor.

Figure 16:
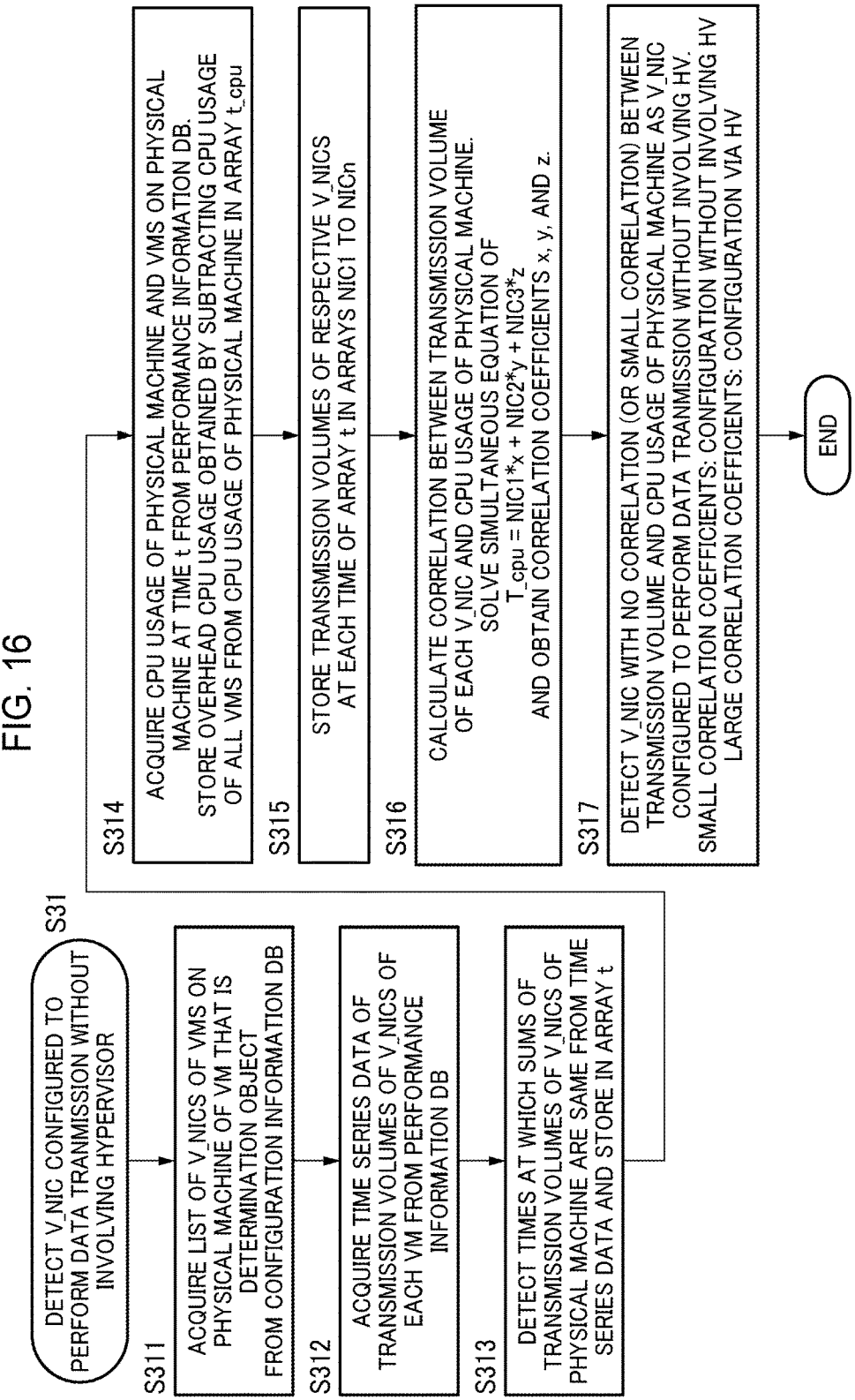
FIG. 16 is a flow chart of a process of detecting a virtual NIC set to the first network configuration.

FIG. 16 is a flow chart of a process of detecting a virtual NIC set to the first network configuration. First, the load calculation program acquires a list of virtual NICs (V_NICs) of all virtual machines VM on a same physical machine PM as the virtual machine VM that is a determination object from the configuration information database (DB) (S311). Specifically, the load calculation program acquires the tables illustrated in FIGS. 23, 24, and 27.

Next, the load calculation program acquires time series data of transmission volumes (I/O data transmission amounts) of virtual NICs (V_NICs) of all virtual machines VM on the same physical machine PM as the virtual machine VM that is a determination object from the performance information DB (S312). Specifically, the load calculation program acquires a V_NIC transmission volume table illustrated in an upper side in FIG. 28.

Subsequently, the load calculation program detects a plurality of times at which sums of transmission volumes of all virtual NICs (V_NICs) in the physical machine PM are the same from the time series data of transmission volumes of the virtual NICs (V_NICs). Although the sums need not necessarily be the same, accuracy improves if the sums are the same. Furthermore, the load calculation program detects a plurality of times at which combinations of proportions of transmission volumes of the respective virtual NICs (V_NICs) are mutually different. Then, the load calculation program stores times that satisfy the two conditions in an array t (S313). The array data is to become data of the respective elements of the simultaneous equation to be described later.

Figure 17:
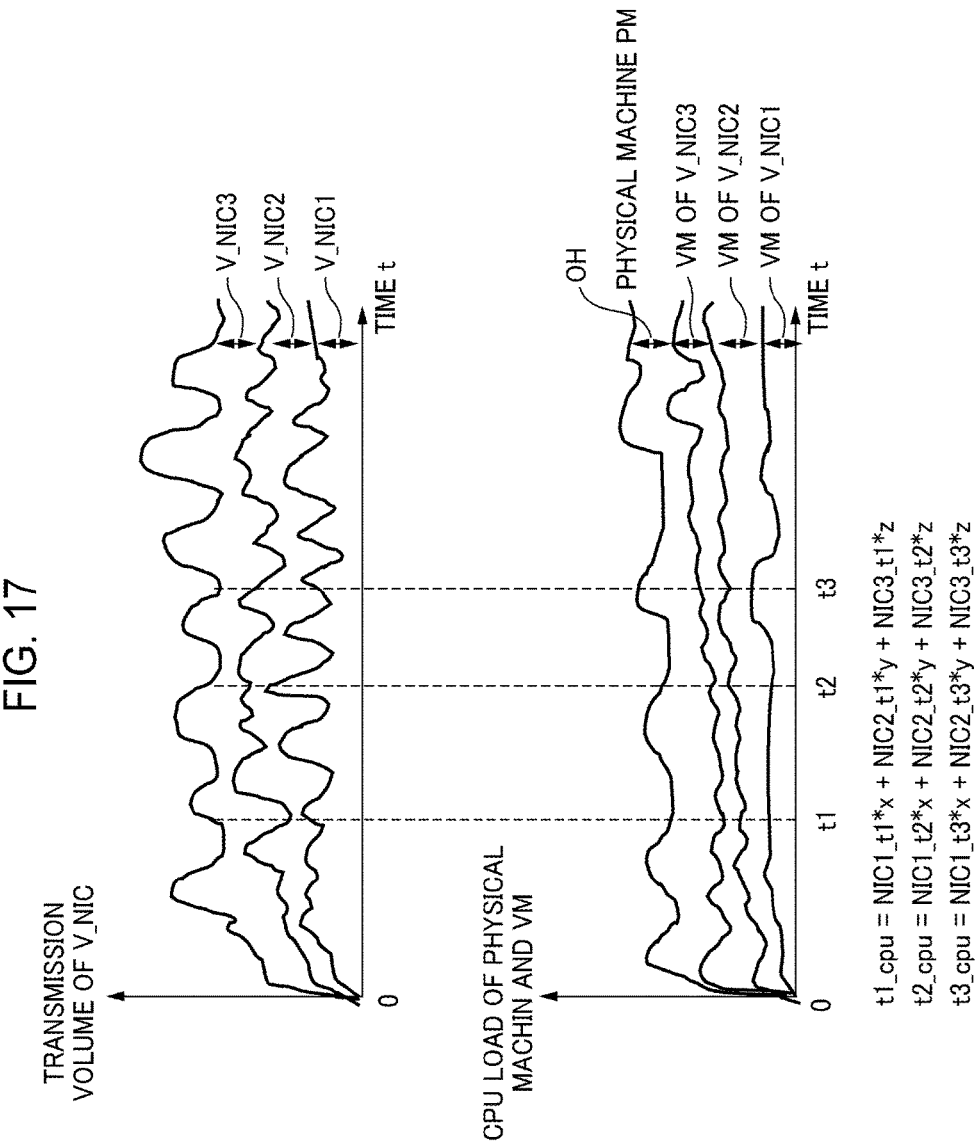
FIG. 17 is a diagram illustrating examples of time series data of transmission volumes of the virtual NICs (V_NICs) and time series data of CPU loads of a physical machine and virtual machines.

FIG. 17 is a diagram illustrating examples of time series data of transmission volumes of the virtual NICs (V_NICs) and time series data of CPU loads of a physical machine and virtual machines. An upper graph in FIG. 17 illustrates time t on its horizontal axis and a transmission volume of V_NIC on its vertical axis, and represents transmission volumes (I/O data transmission amounts) of all virtual NICs (V_NIC1, V_NIC2, and V_NIC3) in the physical machine PM illustrated in FIG. 15. The graph illustrates transmission volumes of three virtual NICs added together. In addition, in the process S313 described above, times t1, t2, and t3 at which sums of transmission volumes of the three virtual NICs are approximately equal to one another but proportions of transmission volumes of the respective virtual NICs differ are selected and stored in the array t. Since the number of times corresponds to the number of samples, the number of times is at least equal to the number of all virtual NICs.

The times to be used as the samples described above are desirably times at which sums of transmission volumes of the three virtual NICs are the same. This is because, since a reception queue overflows and a CPU load is generated as the transmission volume increases, by making the sum of transmission volumes of the three virtual NICs equal to each other at three sample times, detection accuracy will be improved. In addition, the times to be used as the samples need to have different proportions of transmission volumes of the three virtual NICs. This is because the simultaneous equations to be described later need to be solved.

Next, the load calculation program acquires CPU loads (CPU usage) of the physical machine PM and the virtual machines VM1, VM2, and VM3 on the physical machine PM at times t (t1, t2, and t3) from the performance information DB (S314). Specifically, CPU loads at times t1, t2, and t3 are acquired from the machine CPU load table illustrated on a lower side of FIG. 28. Furthermore, the load calculation program stores an overhead OH of a CPU load (CPU usage) obtained by subtracting the acquired CPU loads (CPU usage) of all virtual machines VM1, VM2, and VM3 from the acquired CPU load (CPU usage) of the physical machine PM in an array t_cpu (S314).

A lower graph in FIG. 17 illustrates time t on its horizontal axis and CPU loads (CPU usage) of the physical machine and the virtual machines on its vertical axis, and represents respective CPU loads of the physical machine PM and all virtual machines VM1, VM2, and VM3 in the physical machine PM illustrated in FIG. 15. This graph similarly illustrates CPU loads of the three virtual machines VM1, VM2, and VM3 added together and the CPU load of the physical machine PM without modification.

In addition, the graph illustrates the overhead OH obtained by subtracting the CPU loads of all virtual machines VM1, VM2, and VM3 from the CPU load of the physical machine PM. The overhead OH of the CPU load of the physical machine is mainly a CPU load needed for processing of a virtual switch of a hypervisor HV when virtual NICs (V_NICs) set to the second network configuration perform transmission (I/O data transmission). When transmission volume (I/O data transmission amount) becomes large, a load due to processing of a virtual switch by a hypervisor needed for the transmission increases. Therefore, the overhead OH described above can be considered to mainly be a CPU load needed for processing of a virtual switch by a hypervisor.

Next, the load calculation program stores transmission volumes of the respective virtual NICs (V_NIC1, V_NIC2, and V_NIC3) at the respective times t1, t2, and t3 in the array t in arrays NIC1, NIC2, and NIC3.

In addition, based on the three sample values described above, the load calculation program calculates correlations between the transmission volumes (NIC1_t1, NIC1_t2, NIC1_t3, NIC2_t1, NIC2_t2, NIC2_t3, NIC3_t1, NIC3_t2, and NIC3_t3) of the respective virtual NICs (V_NIC1, V_NIC2, and V_NIC3) and the CPU usage (t1_cpu, t2_cpu, and t3_cpu3) of the physical machine (S316). As a specific calculation method, correlation coefficients x, y, and z are assigned to each virtual NIC, the following simultaneous equations illustrated in FIG. 17 are formed, and the simultaneous equations are solved to obtain the correlation coefficients x, y, and z.

$$t1\_cpu = NIC1\_t1 * x + NIC2\_t1 * y + NIC3\_t1 * z$$

$$t2\_cpu = NIC1\_t2 * x + NIC2\_t2 * y + NIC3\_t2 * z$$

$$t1\_cpu = NIC3\_t1 * x + NIC2\_t3 * y + NIC3\_t3 * z \qquad (6)$$

For each virtual NIC, the load calculation program determines the first network configuration that does not involve a hypervisor for a virtual NIC (V_NIC) with little or no correlation between a transmission volume thereof and the overhead OH of CPU usage of the physical machine. Furthermore, the load calculation program determines the second network configuration via a hypervisor for a virtual NIC (V_NIC) for which the correlation described above exists or is large.

Specifically, when the correlation coefficients x, y, and z acquired by solving the simultaneous equations represented by Expression (6) above are 0 or approximately 0, since there is little or no correlation, a determination of the first network configuration is made. When the correlation coefficients are not 0 or larger than 0, since there is correlation, a determination of the second network configuration is made. Alternatively, by comparing the correlation coefficients x, y, and z, a determination of the first network configuration may be made for a virtual NIC of a group whose correlation coefficients are small and a determination of the second network configuration may be made for a virtual NIC of a group whose correlation coefficients are large.

Since a virtual NIC with no correlation implies that the virtual NIC is unrelated to a CPU load generated in the case of the second network configuration via a hypervisor, a determination that the virtual NIC is set to the first network configuration can be made. In addition, since a virtual NIC with correlation implies that the virtual NIC is related to a CPU load generated in the case of the second network configuration via a hypervisor, a determination that the virtual NIC is set to the second network configuration can be made.

A description of an example where a virtual machine VM uses one virtual NIC has been given above. However, even in cases where any of the virtual machines VM on one physical machine PM uses a plurality of virtual NICs, as long as a transmission volume of each virtual NIC can be monitored and acquired, a virtual NIC set to the first network configuration can be detected by solving the correlation coefficient of each virtual NIC using Expression (6) presented above. As described earlier, a transmission volume of each virtual NIC can be acquired by general methods. In addition, even when a virtual machine VM uses a plurality of virtual NICs, the overhead OH of the CPU load of the physical machine can be acquired from the CPU load of the physical machine and a sum of the CPU loads of the respective virtual machines VM.

Furthermore, when there is only one virtual NIC of the virtual machine VM on the physical machine, a determination of either the first or the second network configuration can be made by studying a correlation between the transmission volume of the one virtual NIC and the overhead OH of the CPU load of the physical machine. In this case, there is no need to form and solve simultaneous equations.

[Processes S32 and S33 for Detecting Virtual NIC (V_NIC) Configured to Perform I/O Data Transmission via Hypervisor and Under Priority Control (Second Network Configuration for Priority Control) and Detecting Virtual NIC Configured to Perform I/O Data Transmission via Hypervisor and Under Non-Priority Control (Second Network Configuration for Non-Priority Control)]

Next, processes of detecting a virtual NIC set to priority control and a virtual NIC set to non-priority control among virtual NICs set to the second network configuration will be described.

Figure 18:
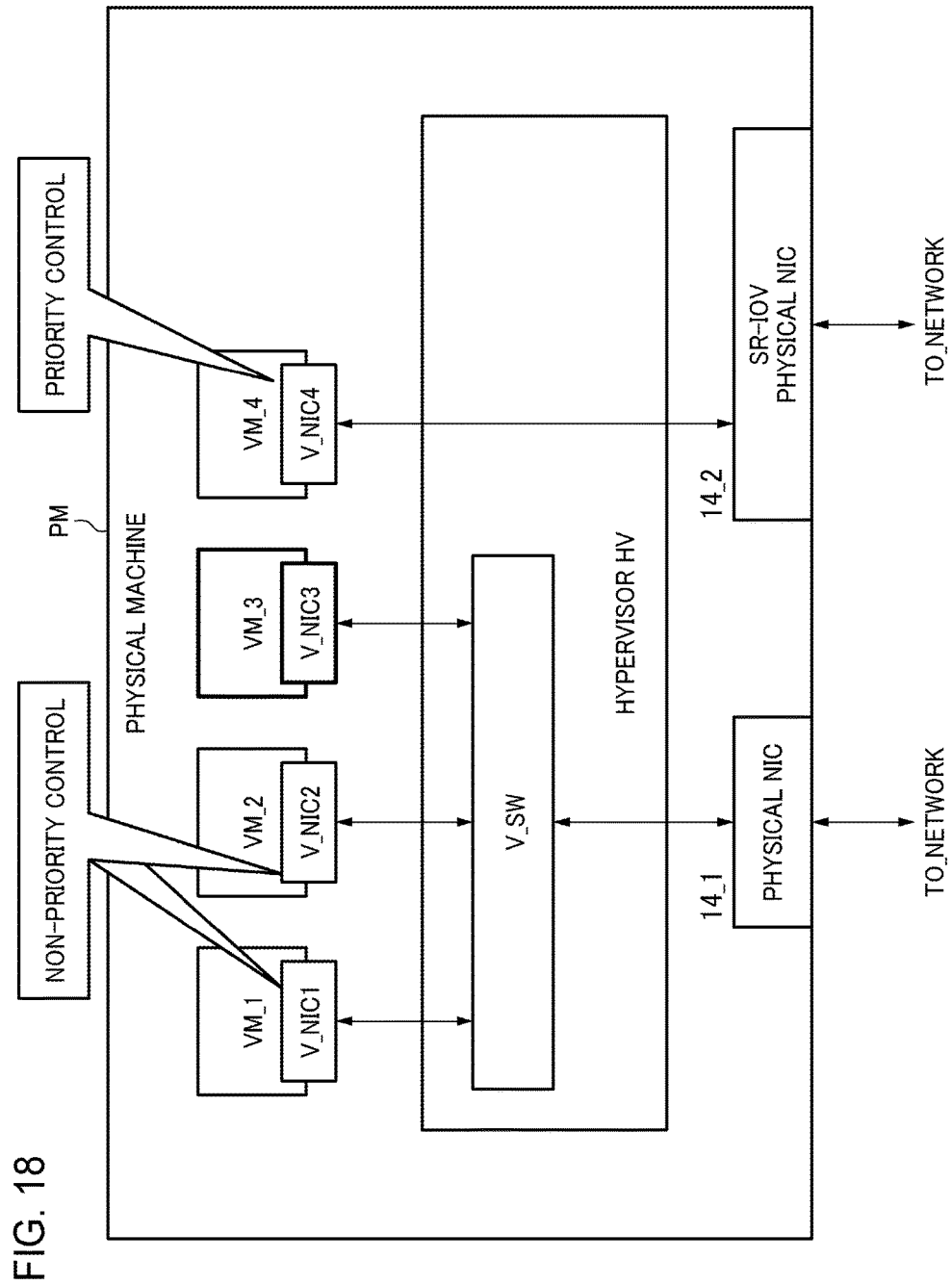
FIG. 18 is a diagram illustrating an example of a relationship between a physical machine and virtual machines in processes of detecting a virtual NIC set to the second network configuration for priority control and the second network configuration for non-priority control.

FIG. 18 is a diagram illustrating an example of a relationship between a physical machine and virtual machines in processes of detecting a virtual NIC set to the second network configuration for priority control and the second network configuration for non-priority control. Virtual machines VM1, VM2, VM3, and VM4 are generated on a physical machine PM illustrated in FIG. 18. In addition, the virtual machines VM1 to VM4 respectively use virtual NICs (V_NIC1 to V_NIC4). The virtual NIC (V_NIC1) of the virtual machine VM1 and the virtual NIC (V_NIC2) of the virtual machine VM2 are set to the second network configuration for non-priority control, and the virtual NIC (V_NIC3) of the virtual machine VM3 is set to the second network configuration for priority control. Furthermore, the virtual NIC (V_NIC4) of the virtual machine VM4 is set to the first network configuration in which I/O data transmission is performed without involving a hypervisor.

As illustrated in FIG. 18, when virtual NICs set to the second network configurations for priority control and non-priority control coexist in a given physical machine PM, the virtual NICs set to the second network configurations for priority control and non-priority control can be distinguished from one another and determined by a method described below. However, when virtual NICs set to the second network configurations for priority control and non-priority control do not coexist, since a switching process of transmission queues does not occur and no correlation is created with the number of CPU interrupts, a determination cannot be made.

Figure 19:
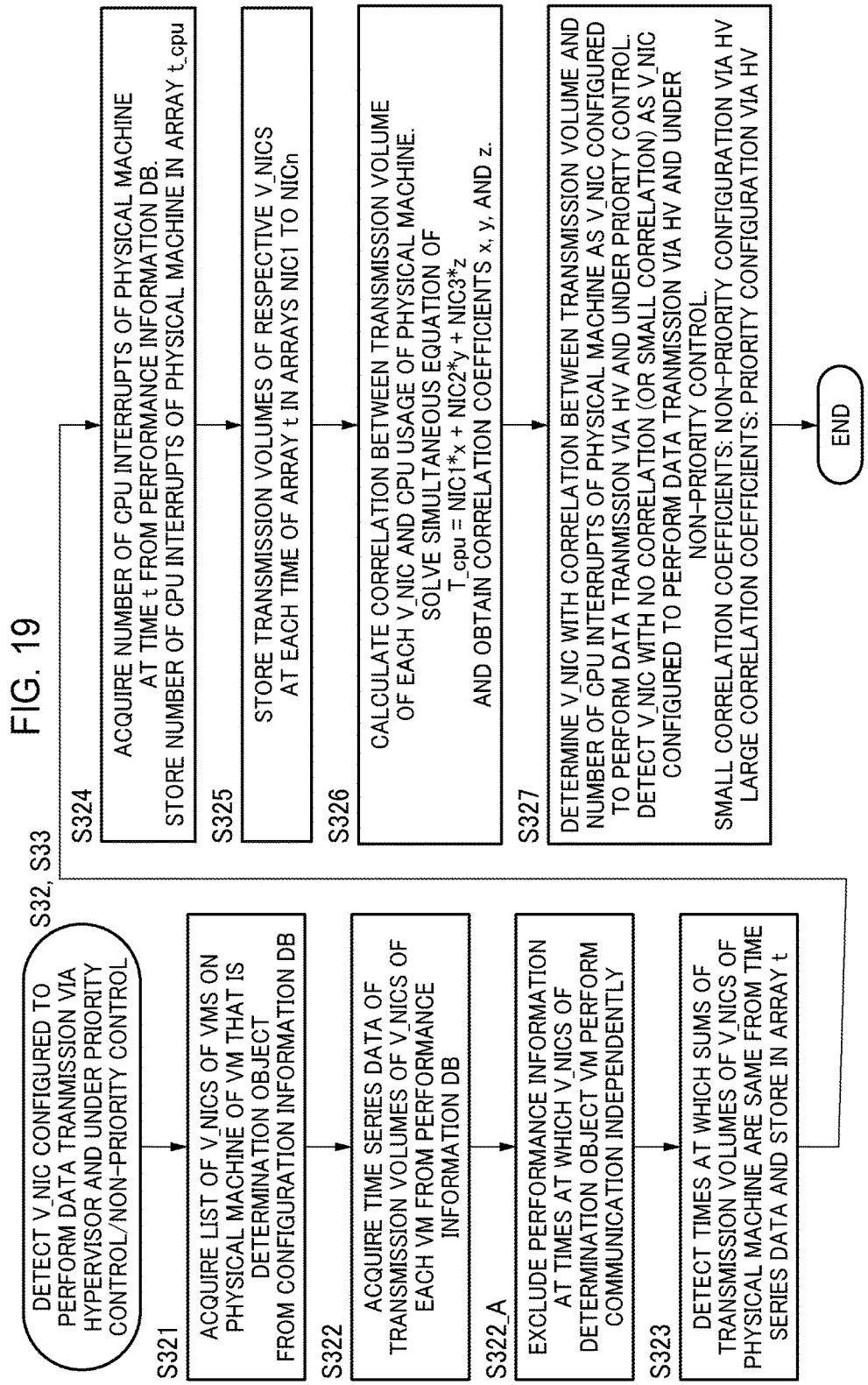
FIG. 19 is a flow chart of a process of detecting virtual NICs set to the second network configurations for priority control and non-priority control.

FIG. 19 is a flow chart of a process of detecting virtual NICs set to the second network configurations for priority control and non-priority control. In a similar manner to FIG. 16, the load calculation program acquires a list of virtual NICs (V_NICs) of virtual machines VM on the physical machine PM of a virtual machine that is a determination object from the configuration information database (DB) (S321), and acquires time series data of transmission volumes (I/O data transmission amounts) of virtual NICs (V_NICs) of the respective virtual machines VM from the performance information DB (S322). The processes S321 and S322 are the same as the processes S311 and S312 illustrated in FIG. 16. However, data of virtual NICs set to the first network configuration is desirably excluded from the time series data of transmission volumes of virtual NICs (V_NICs) of the virtual machines VM to be acquired. Since the purpose of this determination is to distinguish between virtual NICs set to the second network configurations for priority control and non-priority control, transmission volume data of virtual NICs not set to the second network configuration is desirably excluded.

In addition, the load calculation program excludes performance information of times at which the virtual NIC (V_NIC) of the virtual machine VM that is the determination object is performing communication alone from the time series data of transmission volumes of the virtual NICs (V_NICs) (S322_A). At a time when communication is performed alone, a virtual switch of a hypervisor is either performing only priority control or only non-priority control. Therefore, since a process of switching between a transmission queue for non-priority control and a transmission queue for priority control does not occur, a correlation between the transmission volume of virtual NICs and the number of CPU interrupts of the physical machine PM cannot be confirmed.

Next, the load calculation program detects a plurality of times at which sums of transmission volumes of all virtual NICs (V_NICs) in the physical machine PM are the same from the time series data of transmission volumes of the virtual NICs (V_NICs). Furthermore, the load calculation program detects a plurality of times at which proportions of transmission volumes of all virtual NICs (V_NICs) are mutually different. Then, the load calculation program stores times that satisfy the two conditions in an array t (S323). The array data is to become data of the respective elements of the simultaneous equation to be described later. Since the number of times corresponds to the number of simultaneous equations, the number of times must at least be the same as the number of virtual NICs.

In addition, in a similar manner to FIG. 16, a plurality of times at which the sums of transmission volumes of all virtual NICs are the same are selected in order to make overheads of increases in the number of CPU interrupts of the physical machine due to increases in transmission volume equal among respective equations (respective times) of the simultaneous equations. Therefore, in order to improve accuracy, times at which sums of the transmission volumes of all virtual NICs are the same are desirably selected. A plurality of times at which the proportions of transmission volumes of all virtual NICs are mutually different are selected because the selection of such times is a condition for solving the simultaneous equations.

Next, the load calculation program acquires the number of CPU interrupts of the physical machine at time t from the performance information DB (S324). An example of the number of CPU interrupts is the physical machine CPU interrupt table illustrated in FIG. 29. In addition, the load calculation program stores the acquired number of CPU interrupts of the physical engine in an array t_cpu (S324).

Figure 20:
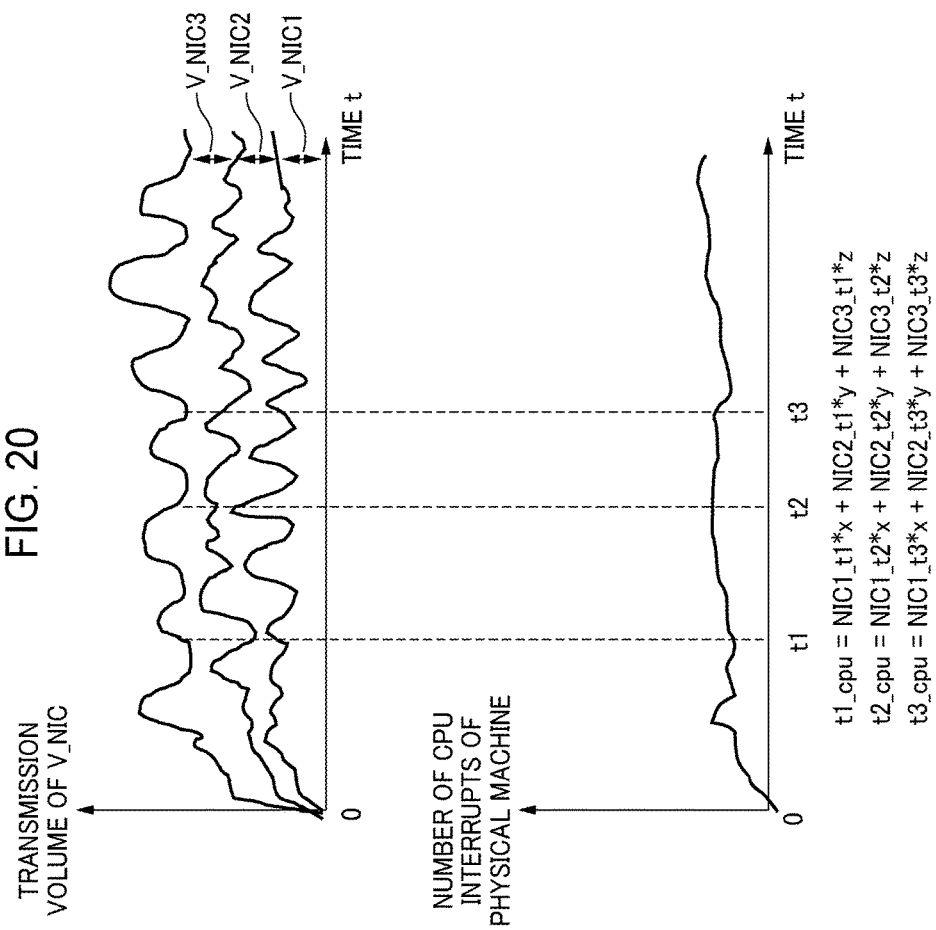
FIG. 20 is a diagram illustrating examples of time series data of transmission volumes of the virtual NICs (V_NICs) and time series data of the number of CPU interrupts of a physical machine.

FIG. 20 is a diagram illustrating examples of time series data of transmission volumes of the virtual NICs (V_NICs) and time series data of the number of CPU interrupts of a physical machine. An upper graph in FIG. 20 illustrates time t on its horizontal axis and transmission volumes of V_NICs on its vertical axis, and represents transmission volumes (I/O data transmission amounts) of all virtual NICs (V_NIC1, V_NIC2, and V_NIC3) set to the second network configuration in the physical machine PM illustrated in FIG. 18. This graph is the same as the upper graph in FIG. 17.

In addition, a lower graph in FIG. 20 illustrates the number of CPU interrupts of a physical machine on its vertical axis and represents the number of CPU interrupts of the physical machine PM illustrated in FIG. 19. Therefore, the numbers of CPU interrupts of the physical machine at the times t1, t2, and t3 are obtained from the lower graph.

Subsequently, the load calculation program stores transmission volumes (I/O data transmission amounts) of the respective virtual NICs (V_NICs) at the respective times t1, t2, and t3 in the array t in arrays NIC1, NIC2, and NIC3 (S325).

Next, the load calculation program calculates correlations between the transmission volumes of the respective virtual NICs (V_NIC1, V_NIC2, and V_NIC3) and the number of CPU interrupts of the physical machine (S326). Specifically, the simultaneous equations illustrated in FIG. 20 are formed and correlation coefficients x, y, and z of the respective virtual NICs are solved. The simultaneous equations illustrated in FIG. 20 are the same as Expression (6) presented earlier.

For each virtual NIC, the load calculation program determines the second network configuration for non-priority control for a virtual NIC (V_NIC) with little or no correlation between a transmission volume thereof and the number of CPU interrupts of the physical machine (S327). Furthermore, the load calculation program determines the second network configuration for priority control for a virtual NIC (V_NIC) for which the correlation described above exists or is large (S327).

Specifically, when the correlation coefficients x, y, and z acquired by solving the simultaneous equations represented by Expression (6) above are 0 or approximately 0, since there is little or no correlation, a determination of the second network configuration for non-priority control is made. When the correlation coefficients are not 0 or larger than 0, since there is correlation, a determination of the second network configuration for priority control is made. Alternatively, by comparing the correlation coefficients x, y, and z, a determination of the second network configuration for non-priority control may be made for a virtual NIC of a group whose correlation coefficients are small and a determination of the second network configuration for priority control may be made for a virtual NIC of a group whose correlation coefficients are large.

Since a virtual NIC with no correlation between its transmission volume and the number of CPU interrupts implies that the virtual NIC is unrelated to the number of CPU interrupts that occur when priority control is performed, a determination that the virtual NIC is set to non-priority control can be made. In addition, since a virtual NIC with correlation implies that the virtual NIC is related to the number of CPU interrupts that occur when priority control is performed, a determination that the virtual NIC is set to priority control can be made.

In the processes S32 and S34 described above, even in cases where a virtual machine VM uses a plurality of virtual NICs, as long as a transmission volume of each virtual NIC can be monitored and acquired, virtual NICs under priority control can be distinguished from those under non-priority control.

[Process S34 of Detecting Difference in CPU Loads (CPU Usage) of Virtual NICs Due to Difference Between Priority Control and Non-Priority Control]

Through the processes described above, a determination is made that a network configuration of all virtual NICs (V_NICs) of a virtual machine VM on a physical machine PM is any of the first network configuration, the second network configuration for priority control, and the second network configuration for non-priority control.

At this point, the load calculation program detects a ratio of a CPU load (CPU usage) due to a virtual NIC set to the second network configuration for priority control to a CPU load (CPU usage) due to a virtual NIC set to the second network configuration for non-priority control.

Figure 21:
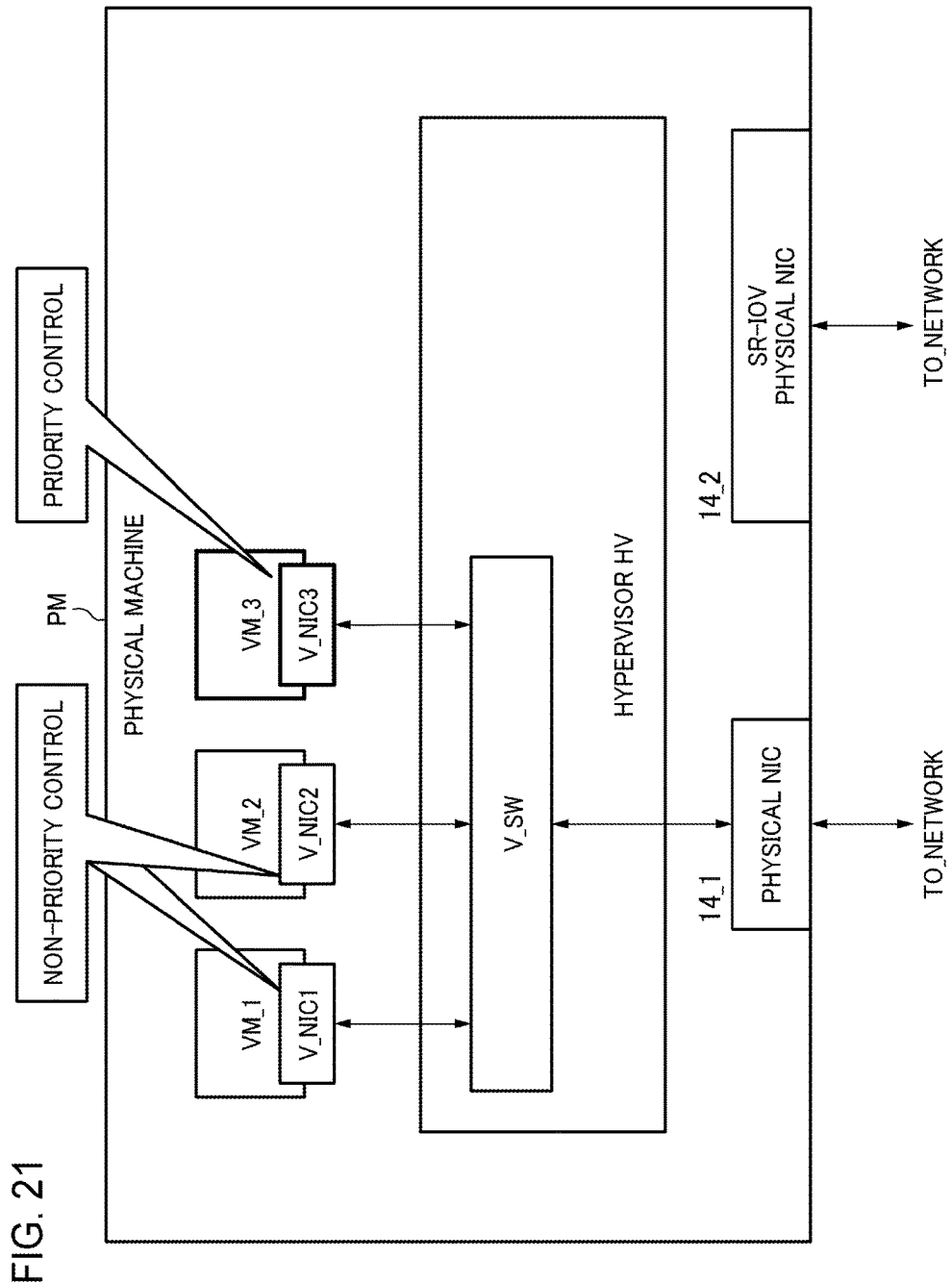
FIG. 21 is a diagram illustrating an example of a relationship between a physical machine and virtual machines in a process of detecting a difference in CPU loads of virtual NICs due to a difference between priority control and non-priority control.

FIG. 21 is a diagram illustrating an example of a relationship between a physical machine and virtual machines in a process of detecting a difference in CPU loads of virtual NICs due to a difference between priority control and non-priority control. Virtual machines VM1, VM2, and VM3 are generated on a physical machine PM illustrated in FIG. 21. In addition, the virtual machines VM1 to VM3 respectively use virtual NICs (V_NIC1 to V_NIC3). The virtual NIC (V_NIC1) of the virtual machine VM1 and the virtual NIC (V_NIC2) of the virtual machine VM2 are set to the second network configuration for non-priority control, and the virtual NIC (V_NIC3) of the virtual machine VM3 is set to the second network configuration for priority control.

In the case illustrated in FIG. 21, since the virtual NIC (V_NIC3) is under priority control, as transmission volume increases, CPU interrupt processes and transmission buffer switching processes under priority control increase. As a result, a CPU load (CPU usage) due to I/O data transmission of the virtual NIC (V_NIC3) under priority control becomes larger than CPU loads (CPU usage) due to I/O data transmission of the virtual NICs (V_NIC1 and V_NIC2) under non-priority control. This difference in CPU loads or, in other words, a ratio of CPU loads is detected as follows.

Figure 22:
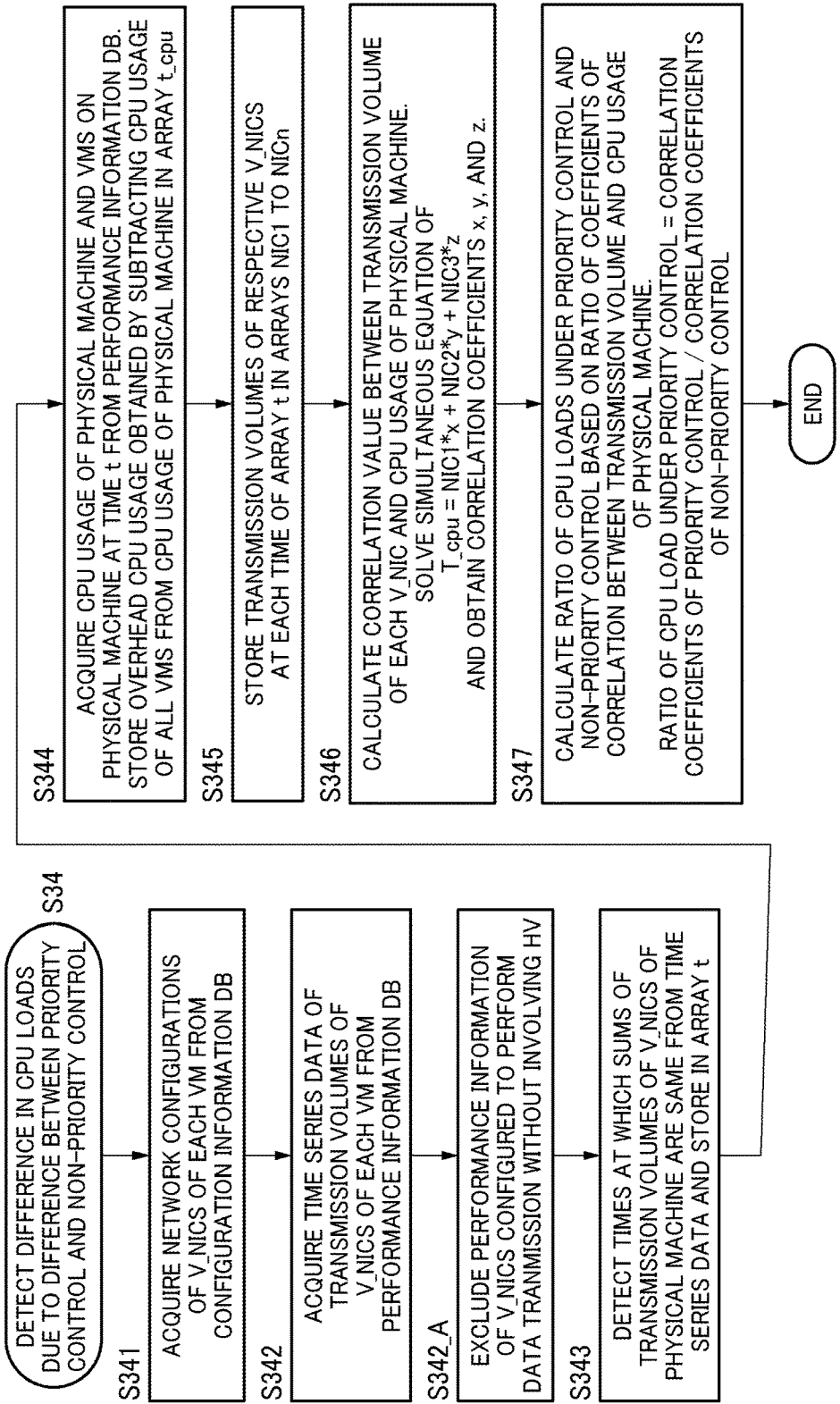
FIG. 22 is a flow chart illustrating a process of detecting a difference in CPU loads of virtual NICs due to a difference between priority control and non-priority control.

FIG. 22 is a flow chart illustrating a process of detecting a difference in CPU loads of virtual NICs due to a difference between priority control and non-priority control. The load calculation program acquires a network configuration of the virtual NIC (V_NIC) of each virtual machine VM from the configuration information DB (S341), and acquires time series data of a transmission volume (I/O data transmission amount) of the virtual NIC (V_NIC) of each virtual machine VM from the performance information DB (S342). The network configuration and the time series data are respectively represented by the network configuration table illustrated in FIG. 25 and the V_NIC transmission volume table illustrated in FIG. 28.

In addition, the load calculation program excludes performance information (transmission volume) of virtual NICs (V_NICs) set to the first network configuration in which I/O data transmission is performed without involving a hypervisor (S342_A). The exclusion narrows the virtual NICs down to those set to the second network configuration that involves a virtual switch of a hypervisor. Accordingly, a ratio of CPU loads of virtual NICs under the priority control and the non-priority control can be obtained with high accuracy.

Next, the load calculation program detects times t at which sums of transmission volumes of virtual NICs in the physical machine that is the determination object are the same from the time series data of transmission volumes of the virtual NICs (V_NICs) and stores the times t in the array t (S343). This process is the same as S313 in FIG. 16. The reasons for detecting times at which the sums of the transmission volumes are the same are also the same.

Subsequently, the load calculation program acquires CPU loads (CPU usage) of the physical machine and virtual machines of the physical machine that are the determination objects at the time t from the performance information DB (S344). In addition, the load calculation program stores an overhead OH of the CPU load of the physical machine obtained by subtracting a sum of the CPU loads (CPU usage) of all virtual machines VM from the CPU load (CPU usage) of the physical machine in an array t_cpu (S344). Furthermore, the load calculation program stores transmission volumes (I/O data transmission amounts) of the respective virtual NICs (V_NICs) at the respective times in the array t in arrays NIC1 to NIC3 (S345).

The two graphs illustrated in FIG. 17 correspond to the processes S342, S343, S344, and S345 described above.

Next, the load calculation program calculates correlations between the transmission volumes of the respective virtual NICs (V_NICs) and the overhead OH of CPU usage of the physical machine (S346). Specifically, the simultaneous equations represented by Expression (6) illustrated in FIG. 17 are solved to obtain the correlation coefficients x, y, and z. In the case of the configuration example illustrated in FIG. 21, although the correlation coefficients x and y of the virtual NICs (V_NIC1 and V_NIC2) under non-priority control are the same, the correlation coefficient z of the virtual NIC (V_NIC3) under priority control is slightly larger than x and y.

Subsequently, the load calculation program calculates a ratio of the correlation coefficient z to the correlation coefficient x and y as a ratio of the CPU load of the virtual NIC (V_NIC3) under priority control to the CPU load of the virtual NIC (V_NIC1 or V_NIC2) under non-priority control (S347). This is expressed by the following equation.

Ratio of CPU load under priority control to CPU load under non-priority control=z/(x or y)

The load calculation program performs the process described above for all physical machines and stores a CPU load ratio for virtual NICs set to the second network configuration for priority control of each physical machine in the priority control CPU load ratio table illustrated in FIG. 29.

[Virtual Machine Load Calculating Process S4]

Next, the load calculation program performs a process of calculating a CPU load of a virtual machine VM that is an object of relocation (or migration), addition, or deletion (S4). Specifically, as illustrated in FIG. 11, when the virtual machine VM3 is to be relocated to the physical machine B, a CPU load that increases when the virtual machine VM3 is relocated to the physical machine B is calculated based on a CPU load (CPU usage) and a transmission volume (I/O data transmission amount) of the virtual machine VM3 at the physical machine A.

For example, when the virtual machine VM3 is set to the second network configuration for non-priority control in which communication is performed under non-priority control via a hypervisor (Example 1), the load calculation program calculates the CPU load (CPU usage) that increases at the physical machine B as explained in FIG. 6B. In other words, the increased CPU load corresponds to a CPU load due to processing by the virtual machine VM3 and an overhead OH of a CPU load corresponding to a transmission volume of the virtual machine VM3.

For example, when the virtual machine VM3 is set to the first network configuration in which communication is performed without involving a hypervisor (Example 2), the load calculation program calculates the CPU load (CPU usage) that increases at the physical machine B as explained in FIG. 8B. In other words, the increased CPU load corresponds to a CPU load due to processing by the virtual machine VM3. There is no increase of the overhead of CPU load for I/O transmission.

For example, when the virtual machine VM3 is set to the second network configuration for priority control in which communication is performed under the priority control via a hypervisor (Example 3), the load calculation program calculates the CPU load (CPU usage) that increases at the physical machine B as explained in FIG. 10B. In other words, the increased CPU load corresponds to a CPU load due to processing by the virtual machine VM3 and an overhead OH (since under priority control, at a higher proportion than non-priority control) of a CPU load corresponding to a transmission volume of the virtual machine VM3.

As described above, according to the present embodiment, a network configuration of a virtual NIC of a virtual machine generated in a physical machine is detected based on performance information. Therefore, based on the detected network configuration of a virtual NIC, a CPU load of each virtual machine is calculated with high accuracy and sizing by relocating virtual machines is executed in an appropriate manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a load calculation program that causes a computer to execute a process comprising:
   acquiring processor usage information including usage of a processor of a managed physical machine, and usage of the processor for each of a plurality of virtual machines generated by a hypervisor executed on the managed physical machine;
   acquiring data transmission information including a data transmission amount for each of a plurality of virtual network interfaces used by the plurality of virtual machines;
   determining a virtual network interface having a second correlation between overhead processor usage, obtained by subtracting a sum of processor usage of the plurality of virtual machines from processor usage of the managed physical machine, and a data transmission amount of the virtual network interface, to be a second virtual network interface that performs data transmission via the hypervisor among the plurality of virtual network interfaces;
   determining a virtual network interface having a first correlation that is smaller than the second correlation between the overhead processor usage and the data transmission amount of the virtual network interface, to be a first virtual network interface that performs data transmission without routing through the hypervisor among the plurality of virtual network interfaces;
   calculating load information including amount of increase or decrease of the processor usage for data transmission in the managed physical machine, which a virtual machine to be added or deleted will be added to or deleted from, based on whether each of the plurality of virtual machines uses the first virtual network interface or the second virtual interface; and
   adding or deleting the virtual machine to be added or deleted to or from a managed physical machine that is selected based on the calculated amount of increase or decrease of the processor usage for data transmission.

2. The non-transitory computer-readable storage medium according to claim 1, further comprising:
   acquiring processor interrupt number information including the number of processor interrupts of the managed computer; and
   detecting the second virtual network interface that is a priority control object subjected to data transmission control prioritized over the second virtual network interface that is not the priority control object, among the plurality of virtual network interfaces based on the processor interrupt number information and the data transmission information, wherein
   in the calculating the load information, the load information including processor usage for data transmission of the virtual machines is calculated, based on whether or not the virtual machines use the detected second virtual network interface that is the priority control object.

3. The non-transitory computer-readable storage medium according to claim 2, wherein
   in the detecting the second virtual network interface that is the priority control object,
   a virtual network interface having a third correlation between the number of processor interrupts and a data transmission amount of the virtual network interface is determined to be the second virtual network interface that is the priority control object, and
   a virtual network interface having a fourth correlation that is smaller than the third correlation between the number of processor interrupts and a data transmission amount of the virtual network interface is determined to be the second virtual network interface that is not the priority control object.

4. The non-transitory computer-readable storage medium according to claim 2, wherein
   in the calculating the load information, processor usage for data transmission of a virtual machine using the second virtual network interface that is the priority control object is calculated to be larger than processor usage of a virtual machine using the second virtual network interface that is not the priority control object.

5. The non-transitory computer-readable storage medium according to claim 4, wherein
   in the calculating the load information, a difference between processor usage for data transmission of a virtual machine using the second virtual network interface that is the priority control object, and processor usage for data transmission of a virtual machine using the second virtual network interface that is not the priority control object, is calculated based on a difference in correlation values between the overhead processor usage and the data transmission amount of the second virtual network interface.

6. The non-transitory computer-readable storage medium according to claim 1,
   further comprising:
   detecting a change in a network configuration of the virtual network interface, based on a change in a monitoring threshold setting of the virtual machines or the managed physical machine.

7. A load calculation method comprising:
   acquiring processor usage information including usage of a processor of a managed physical machine, and usage of the processor for each of a plurality of virtual machines generated by a hypervisor executed on the managed physical machine;

acquiring data transmission information including a data transmission amount for each of a plurality of virtual network interfaces used by the plurality of virtual machines;

determining a virtual network interface having a second correlation between overhead processor usage, obtained by subtracting a sum of processor usage of the plurality of virtual machines from processor usage of the managed physical machine, and a data transmission amount of the virtual network interface, to be a second virtual network interface that performs data transmission via the hypervisor among the plurality of virtual network interfaces;

determining a virtual network interface having a first correlation that is smaller than the second correlation between the overhead processor usage and the data transmission amount of the virtual network interface, to be a first virtual network interface that performs data transmission without routing through the hypervisor, among the plurality of virtual network interfaces;

calculating load information including amount of increase or decrease of the processor usage for data transmission in the managed physical machine, which a virtual machine to be added or deleted will be added to or deleted from, based on whether each of the virtual machines uses the first virtual network interface or the second virtual interface; and adding or deleting the virtual machine to be added or deleted to or from a managed physical machine that is selected based on the calculated amount of increase or decrease of the processor usage for data transmission.

8. A load calculation apparatus comprising:

a memory; and a processor that is accessible to the memory, wherein the processor executes a process of, acquiring processor usage information including usage of a processor of a managed physical machine, and usage of the processor for each of a plurality of virtual machines generated by a hypervisor executed on the managed physical machine;

acquiring data transmission information including a data transmission amount for each of a plurality of virtual network interfaces used by the plurality of virtual machines;

determining a virtual network interface having a second correlation between overhead processor usage, obtained by subtracting a sum of processor usage of the plurality of virtual machines from processor usage of the managed physical machine, and a data transmission amount of the virtual network interface, to be a second virtual network interface that performs data transmission via the hypervisor among the plurality of virtual network interfaces;

determining a virtual network interface having a first correlation that is smaller than the second correlation between the overhead processor usage and the data transmission amount of the virtual network interface, to be a first virtual network interface that performs data transmission without routing through the hypervisor among the plurality of virtual network interfaces;

calculating load information including amount of increase or decrease of the processor usage for data transmission in the managed physical machine, which a virtual machine to be added or deleted will be added to or deleted from, based on whether each of the virtual machines uses the first virtual network interface; and adding or deleting the virtual machine to be added or deleted to or from a managed physical machine that is selected based on the calculated amount of increase or decrease of the processor usage for data transmission.

* * * * *